US006101488A

United States Patent [19]

Hayashi et al.

[11] Patent Number: 6,101,488

[45] **Date of Patent: *Aug. 8, 2000**

[54] INTELLIGENT INFORMATION PROGRAM GENERATION AND RETRIEVAL SYSTEM

[75] Inventors: Yoshitaka Hayashi; Keiichi Oketani, both of Kanazawa; Shunji Matsumoto; Yutaka Miyahara, both of Kawasaki, all of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/811,541

[22] Filed: Mar. 4, 1997

[30] Foreign Application Priority Data

Sep. 4, 1996 [JP] Japan .................................... 8-234160

[51] Int. Cl.[7] ...................................................... G06N 17/00

[52] U.S. Cl. ................................. 706/45; 706/46; 706/47

[58] Field of Search ................................. 706/51, 45, 46, 706/60, 47, 48, 49; 395/703, 710; 707/100; 345/326

[56] References Cited

U.S. PATENT DOCUMENTS 4,658,370 4/1987 Erman et al. ............................. 706/60
5,208,898 5/1993 Funabashi et al. ..................... 706/445
5,444,823 8/1995 Nguyen ..................................... 395/51
5,519,608 5/1996 Kupiec .................................... 395/600
5,539,862 7/1996 Short et al. ............................... 706/45
5,638,492 6/1997 Maeda et al. ............................. 706/45
5,659,668 8/1997 Misono et al. ............................ 706/60
5,696,962 12/1997 Kupiec .................................... 395/604
5,720,001 2/1998 Nguyen ..................................... 395/10
5,740,425 4/1998 Povilus ....................................... 395/6
5,745,895 4/1998 Bingham et al. ......................... 707/10
5,748,188 5/1998 Hu et al. ................................. 345/326
5,768,578 6/1998 Kirk et al. .............................. 707/100
5,889,520 3/1999 Glasser .................................... 345/349
5,950,196 9/1999 Pyreddy et al. ............................ 707/5
5,991,714 11/1999 Shaner ........................................ 704/9

FOREIGN PATENT DOCUMENTS 0 314 279 5/1989 European Pat. Off. .
0 578 830 1/1994 European Pat. Off. .

OTHER PUBLICATIONS

Chen et al., "A knowledge based approach to the design of document based retrieval systems", ACM pp 281–290, Feb. 1990.

Isahara et al., "Intelligent network news reader", ACM IUI, pp. 237–240, 1997.

(List continued on next page.)

*Primary Examiner*—Eric W. Stamber
*Assistant Examiner*—Anil Khatri
*Attorney, Agent, or Firm*—Staas & Halsey, LLP

[57] ABSTRACT

An intelligent information retrieval program generation system can easily generate an intelligent information retrieval program that is applicable to a wide-area information network such as the Internet. When questions to be used as criteria for determining conclusions, answer alternatives to the questions, and information of conclusions are inputted, a table defining unit defines a conclusion determining table which comprises answer alternatives to each of the questions and conclusions. A knowledge establishing unit displays the conclusion determining table on a display screen, receives inputted answer conditions for the conclusions to be selected, and establishes the answer conditions in the conclusion determining table. A retrieval program generator generates an intelligent information retrieval program for decoding the conclusion determining table in which the knowledge has been established, displaying questions, receiving answers to the questions, and determining conclusions depending on the answers. The retrieval program generator further generates a document containing the intelligent information retrieval program by incorporating the generated intelligent information retrieval program into a document description language in the form of a hypertext.

13 Claims, 24 Drawing Sheets

OTHER PUBLICATIONS

Shibata et al., "Dynamic hypertext and knowledge agent systems for multimedia inf. netwrok", Hypertext' 93 Proceedings, pp. 82–93, Nov. 1993.

Shibata et al, "Dyanmic hypertext and knowledeg agent system for multimedia information networks", Hypertext Proc. pp. 82–93, Nov. 1993.

Chen et al."Webmate: A persona; agent for browsing and serching", ACM Autonomous Agents, pp. 132–139, Jan. 1998.

Osborn et al, "JUSTICEL A Judicial search tool using intelligent concept extraction", ACM ICAIL, pp. 173–181, Aug. 1999.

Malone et al, Intelligent infrmation sharing system, Comm. of the ACM, vol. 30, No. 5, pp. 390–402, Nov. 1993.

Tiben, "Knowledge bases for user guidance in information seeking dialogues", ACM IUI, pp. 149–156, Jul. 1992.

Bhatia, "Selection of search terms based on user profile", ACM pp. 224–233, Nov. 1993.

Schulzrinne H: "World Wide Web: Whence, Whither, What Next?" IEEE Network: The Magazine of Computer Communications, vol. 10, No. 2, Mar. 1, 1996, pp. 10–17.

Boerner T: "Die Neue Programmiersprache Java Reif Fuer Die Insel" Chip Zeitschrift Fuer Mikrocomputer–Technik, No. 3, Mar. 1, 1996, pp. 212–214.

Q table (51)

| Q No. | Q brief name | Q displayed name | Reference pattern | Q U R L |
|---|---|---|---|---|
| 1 | Budget | Budget per person | 1 | |
| 2 | Food | Type of food you like to have | 2 | |
| 3 | | | | |

A table (52)

| Q No. | A No. | Sequence No. | A brief name | A displayed name |
|---|---|---|---|---|
| 1 | 1 | 010 | Less than 5 | Less than 5,000 yen |
| 1 | 2 | 020 | At least 5 | At least 5,000 yen |
| 2 | 1 | 030 | Japanese food | Japanese food |
| 2 | 2 | 010 | Western food | Western food |

R table (53)

| R No. | Sequence No. | R brief name | R U R L | R related table |
|---|---|---|---|---|
| 1 | 010 | Japanese food1 | Conclusion1.html | |
| 2 | 020 | TB2 | | Related2.html |
| 3 | 030 | Japanese food2 | Conclusion2.html | |
| 4 | 040 | TB3 | | Related3.html |

Matrix table (54)

| | Sequence | 1 1 | 1 2 | 2 1 | 2 2 |
|---|---|---|---|---|---|
| R1 | 010 | 0 | 1 | 0 | 1 |
| R2 | 020 | 0 | 1 | 1 | 0 |
| R3 | 030 | 1 | 0 | 0 | 1 |
| R4 | 040 | 0 | 1 | 1 | 0 |

| table1 | Q1 | | Q1 | |
|---|---|---|---|---|
| | A1 | A2 | A1 | A2 |
| result1 | ○ | × | ○ | × |
| table2 | ○ | × | × | ○ |
| result2 | × | ○ | ○ | × |
| table3 | × | ○ | × | ○ |

11bb

| table2 | Q1 | |
|---|---|---|
| | A1 | A2 |
| result3 | ○ | × |
| result4 | × | ○ |

11bc

| table3 | Q1 | |
|---|---|---|
| | A1 | A2 |
| result5 | ○ | × |
| result6 | × | ○ |

FIG. 13

```
<HTML>
<HEAD>
<TITLE>Table1</TITLE>
<SCRIPT>
function next_location (q1, q2 )  {
        var url
        if  (q1.selectedIndex == 0)  {
                if (q2[0]. checked)  {
                        url = "result1.html"
                }  else  {
                        url = "table2.html"
                }
        }  else  {
                if (q2[0]. checked)  {
                        url = "result2.html"
                }  else  {
                        url = "table3.html"
                }
        }
        window.location = url
        return true
}
</SCRIPT>
</HEAD>
<BODY>
<FROM NAME="questions">
<BR>
QUESTION 1: BUDGET PER PERSON ?
<SELECT NAME="Q1" SIZE="2">
<OPTION VALUE="A1" SELECTED <5,000 YEN
<OPTION VALUE="A2"≧ 5,000 YEN
</SELECT>
<HR>
QUESTION 2: WHAT TYPE OF FOOD DO YOU LIKE TO HAVE ?
            (CHOOSE FROM PHOTOGRAPHS BELOW)
<BR>
<BR>
<TABLE BORDER>
<TR>
<TD><IMG SRC="picture.gif"></TD>
<TD><IMG SRC="picture.gif"></TD>
</TR>
<TR ALIGN=center>
<TC><INPUT TYPE="redio" NAME="Q2" CHECKED>CHINESE FOOD</TD>
<TC><INPUT TYPE="redio" NAME="Q2">WESTERN FOOD</TD>
</TR>
</TABLE>
<HR>
<INPUT TYPE="button" VALUE="OK"onClick="next_location
(document.questions.Q1, document.questions.Q2)">
</FROM>
</BODY>
</HTML>
```

61 (bracket: <SCRIPT> through </SCRIPT>)

62 (bracket: <BODY> through </FROM>)

FIG. 14

```
<HTML>
<HEAD>
<TITLE>Table2</TITLE>
<SCRIPT>
funtion openDialog (url) {
    dialogWin=window.open(url,"Dialog","toolbar=no,scrollbars=no,width=250,hight=180]
    dialogWin.from = window
    //dialogWin = window.open(url,"Dialog","toolbar=no,scrollbars=no"]
    return true
}
function next_location (q1_index) {
    var url
    if (q1.index == 0) {
        url = "result3.html"
    } else {
        url = "result4.thml"
    }
    window.location = url
    return true
}
</SCRIPT>
</HEAD>
<BODY>
<FROM NAME="questions">
<BR>3
QUESTION 3: FRENCH FOOD OR ITALIAN FOOD ?                    ⎫
<INPUT TYPE="button" VALUE="OK" onClick Me"onClick="openDialg('dialog0.html')">   ⎬ 63
<HR>                                                         ⎭
<INPUT TYPE="button" VALUE="OK" onClick= "next_location(q1_index)">  } 64
</FROM>
</BODY>
</HTML>
```

FIG. 15

```
<HTML>
<HEAD>
<TITLE>CONCLUSION5</TITLE>
</HEAD>
<BODY>
INTRODUCTION OF RESTAURANT: ITALIAN FOOD *** RESTAURANT   } 65
</BODY>
</HTML>
```

FIG. 16

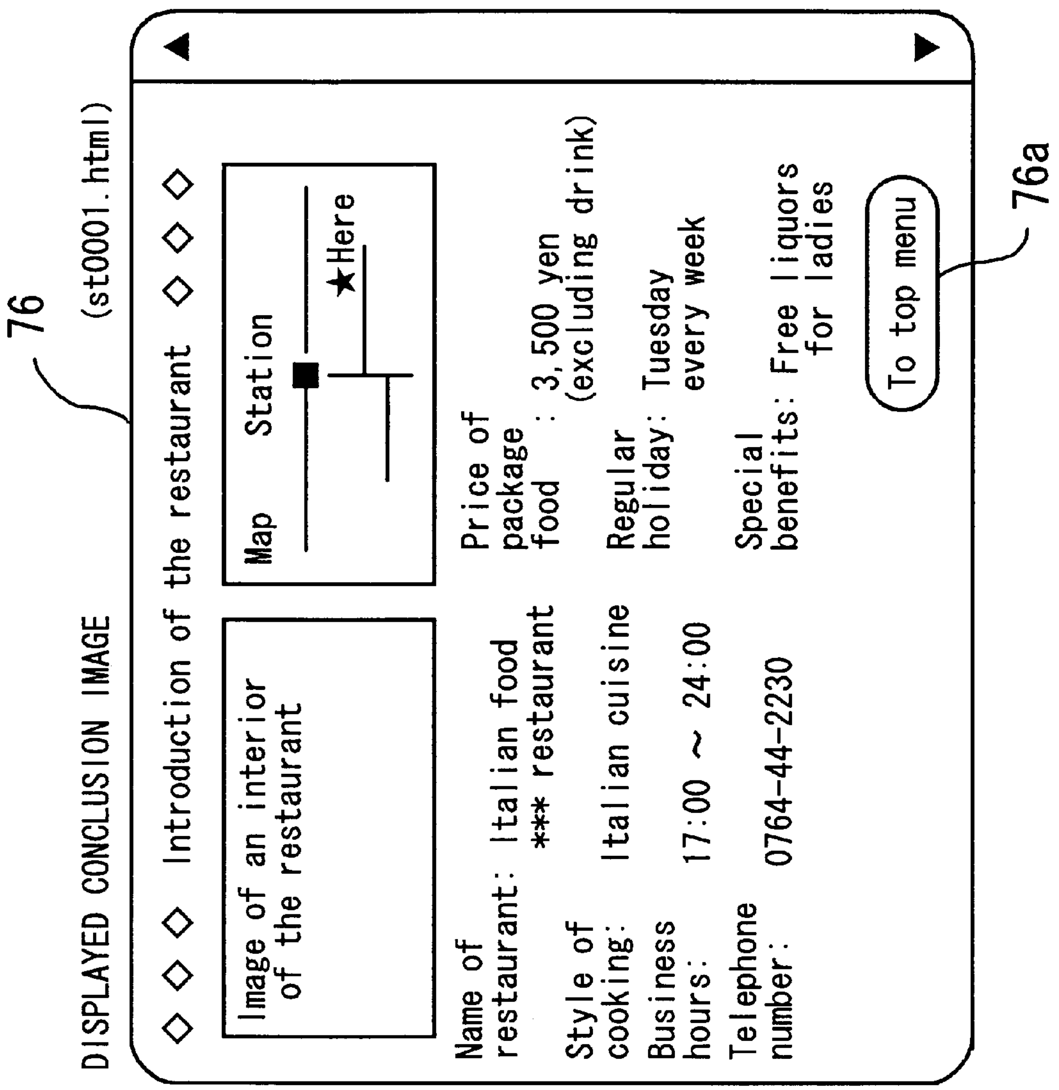

FIG. 23

DISPLAYED CONCLUSION IMAGE

◇ ◇ ◇ Introduction of the restaurant ◇ ◇ ◇ (st0001.html) — 76

Image of an interior of the restaurant

Map  Station
     ★Here

Name of restaurant: Italian food *** restaurant
Style of cooking: Italian cuisine
Business hours: 17:00 ~ 24:00
Telephone number: 0764-44-2230
Price of package food : 3,500 yen (excluding drink)
Regular holiday: Tuesday every week
Special benefits: Free liquors for ladies To top menu — 76a (err001.html)

★★The information you wanted cannot be displayed for the★★
following reason:

■Since you have not answered all questions, it has been unable to identify information. Please confirm questions and answers again.

To questionary image

To top menu

INTELLIGENT INFORMATION PROGRAM GENERATION AND RETRIEVAL SYSTEM

BACKGROUND OF THE INVENTION (1) Field of the Invention

The present invention relates to an intelligent information retrieval program generation system for generating an intelligent information retrieval program and an intelligent information retrieval system, and more particularly to an intelligent information retrieval program generation system for generating an intelligent information retrieval program incorporated in a document prepared using an information description language that is applicable to a wide-area information network such as the Internet, and an intelligent information retrieval system for retrieving intelligent information on an interactive basis.

(2) Description of the Related Art

As the Internet becomes more and more popular, Internet users can access to various pieces of information from various sources around the world while staying at home or office. On the Internet, an Internet user can browse various documents residing on WWW (World Wide Web) servers in GUI (Graphical User Interface) format using a WWW browser.

The WWW generally operates as follows: When an Internet user inputs an address (URL: Uniform Resource Locator) of information which the user wants to view with a WWW browser, a document having that address is downloaded from a WWW server to the WWW terminal of the user. The WWW browser converts the downloaded document into a predetermined format and then displays it on a display screen. In this manner, the user can view and obtain various pieces of information from WWW servers over the Internet. Most of the information available on the Internet is in the form of documents prepared using an information description language known as HTML (Hyper Text Markup Language).

According to the above WWW process, the Internet user cannot gain access to a desired Web document unless he has an URL of that document. Since the amount of information available on the Internet is huge, the Internet user cannot necessarily reach a desired Web document simply by following links between documents. Therefore, it is necessary for the user to rely on WWW servers which provide document retrieval services. When a retrieval request is received from a WWW terminal, a WWW server starts a retrieval program through a CGI (Common Gateway Interface). The retrieval program makes an inquiry to a database, and converts retrieved data from the database into a document written in the HTML format. The produced HTML document is then transmitted to the WWW terminal.

Heretofore, it has been customary for each WWW server to effect all the processing for retrieving information requested by an Internet user. Therefore, the WWW server has undergone an excessive burden. If WWW terminals can carry out retrieval work for Internet users, then the burden on WWW servers will be reduced. Such a WWW terminal retrieval capability may be incorporated in an intelligent information retrieval system which allows a user to input information relative to a desired document on an interactive basis and which provides the desired document based on the inputted information. The intelligent information retrieval system with the WWW terminal retrieval capability is not affected by the data transfer rate between a WWW terminal and a WWW server. There has been a demand in the art for a system which can easily generate an information retrieval program that is capable of retrieving information on an interactive basis.

SUMMARY OF THE INVENTION

It is an object of the present invention to provide an intelligent information retrieval program generation system for generating an intelligent information retrieval program, which is applicable to a wide-area information network such as the Internet.

Another object of the present invention is to provide an intelligent information retrieval system capable of an executing an information retrieval process on an interactive basis at a terminal where desired information is to be received.

To accomplish the above objects, there is provided in accordance with the present invention an intelligent information retrieval program generation system for assisting in generating a program for providing an intelligent information retrieval function. The intelligent information retrieval program generation system comprises table defining means for receiving questions to be used as criteria for determining conclusions, answer alternatives to the questions, and information of conclusions, and defining a conclusion determining table which comprises the answer alternatives and the conclusions, knowledge establishing means for displaying the conclusion determining table on a display screen, receiving inputted answer conditions for the conclusions to be selected, and establishing the answer conditions in the conclusion determining table, and retrieval program generating means for generating, based on the conclusion determining table, an intelligent information retrieval program for receiving answers inputted to the questions on an interactive basis and displaying conclusions in response to the answers, and incorporating the intelligent information retrieval program into a document having a logic structure according to a predetermined information description language.

According to the present invention, there is also provided an intelligent information retrieval system for retrieving intelligent information on an interactive basis. The intelligent information retrieval system comprises retrieval-program-containing document storage means for storing a retrieval-program-containing document incorporating an intelligent information retrieval program which has a logic structure according to a predetermined information description language for receiving answers inputted to questions on an interactive basis and displaying conclusions in response to the answers, and structured document browsing means for browsing a document having a logic structure according to the predetermined information description language, and browsing the retrieval-program-containing document and executing the intelligent information retrieval program incorporated in the retrieval-program-containing document when the retrieval-program-containing document is acquired from the retrieval-program-containing document storage means.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 11 is a diagram showing tables generated in an intelligent information retrieval program generation system;

FIG. 13 is a diagram showing, by way of example, tabular knowledge data that are generated;

FIG. 14 is a diagram showing, by way of example, a document containing an intelligent information retrieval program that has been generated based on tabular knowledge data referred to as "tablet1";

FIG. 15 is a diagram showing, by way of example, a document containing an intelligent information retrieval program that has been generated based on tabular knowledge data referred to as "table2";

FIG. 16 is a diagram showing, by way of example, an HTML document of a conclusion;

FIG. 23 is a view showing, by way of example, a displayed image of a conclusion.

DETAILED DESCRIPTION OF THE PREFERRED EMBODIMENT

Figure 1:
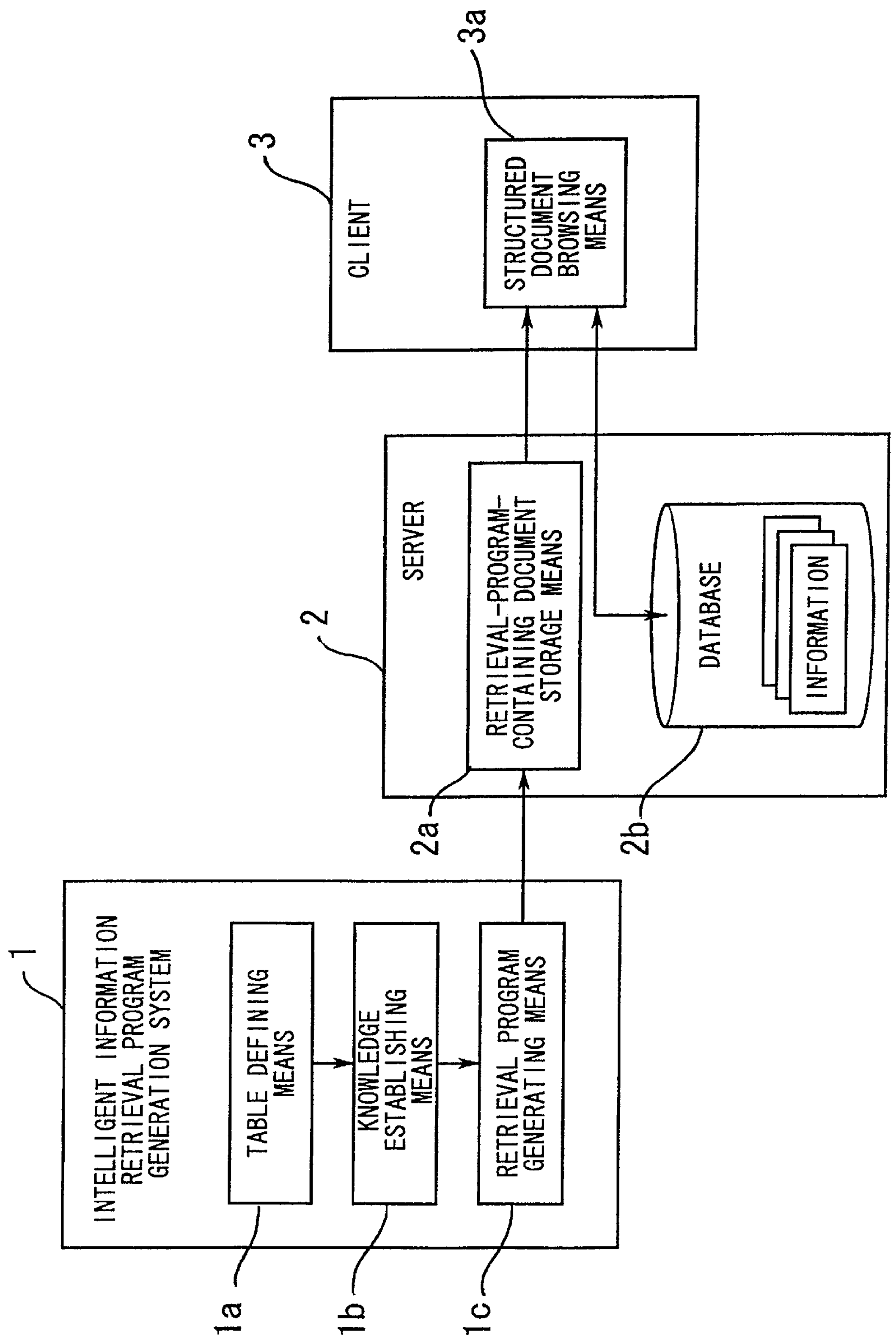
FIG. 1 is a block diagram showing the principles of the present invention.

FIG. 1 shows in block form the principles of the present invention. As shown in FIG. 1, an intelligent information retrieval program generation system 1 has a table defining means 1*a*, a knowledge establishing means 1*b*, and a retrieval program generating means 1*c*. When questions to be used as criteria for determining conclusions, answer alternatives to the questions, and information of conclusions are inputted, the table defining means 1*a* defines a conclusion determining table which comprises answer alternatives to each of the questions and conclusions. The knowledge establishing means 1*b* displays the conclusion determining table on a display screen, receives inputted answer conditions for the conclusions to be selected, and establishes the answer conditions in the conclusion determining table. The retrieval program generating means 1*c* generates an intelligent information retrieval program for decoding the conclusion determining table in which the knowledge has been established, displaying questions, receiving answers to the questions, and determining conclusions depending on the answers. The retrieval program generating means 1*c* further generates a document containing the intelligent information retrieval program by incorporating the generated intelligent information retrieval program into a document description language in the form of a hypertext.

The generated document containing the intelligent information retrieval program is stored in a retrieval-program-containing document storage means 2*a* in a server 2. When the document containing the intelligent information retrieval program is accessed by a structured document browsing means 3*a* in a client 3 which is connected to the server 2, the document containing the intelligent information retrieval program is downloaded into the structured document browsing means 3*a*. Then, the structured document browsing means 3*a* executes the intelligent information retrieval program contained in the downloaded document. As a result, questions defined by the table defining means 1*a* and answer alternatives to the questions are displayed on a display screen of the client 3. When the user input answers, the inputted answers and the knowledge established by the knowledge establishing means 1*b* are compared with each other, producing a conclusion. If the conclusion is represented by the address of a document within a database 2*b* on the server 2, then the document is downloaded and browsed by the structured document browsing means 3*a*.

The intelligent information retrieval program generation system 1 allows a document containing an intelligent information retrieval program to be easily generated in a tabular form. If the document containing the intelligent information retrieval program is used by a WWW server on the Internet, then the burden on the WWW server can be reduced because an information retrieval process is carried out at a WWW terminal. An embodiment of the present invention which is applied to a WWW server on the Internet will be described below.

Figure 2:
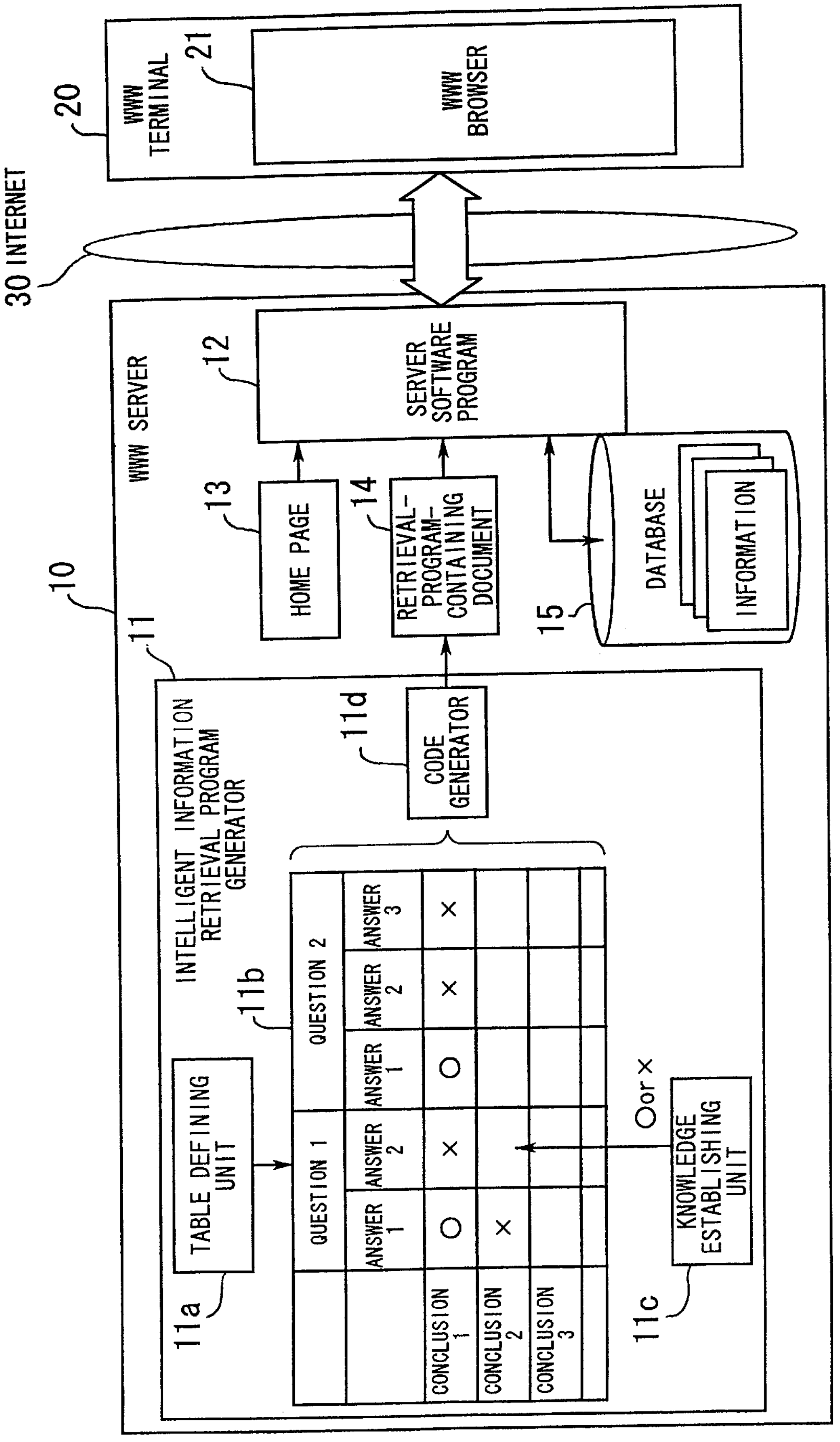
FIG. 2 is a block diagram of a network system to which the present invention is applied.

FIG. 2 shows in block form a network system to which the present invention is applied. In FIG. 2, a WWW server 10 and a WWW terminal 20 are connected to each other through the Internet 30.

The WWW server 10 has an intelligent information retrieval program generator 11. The intelligent information retrieval program generator 11 includes a table defining unit 11*a* for receiving questions to be used as criteria for determining conclusions, answer alternatives to the questions, and information relative to conclusions. The conclusions may represent document information to be provided to the user or a table in which other knowledge has been inputted. The table defining unit 11*a* generates a table 11*b* from inputted information. The intelligent information retrieval program generator 11 also includes a knowledge establishing unit 11*c* for receiving knowledge which is inputted by the operator as true or false with respect to each of the answer alternatives. The knowledge establishing unit 11*c* establishes the inputted knowledge as "○" or "×" with respect to each of the answer alternatives in the table 11*b*.

The intelligent information retrieval program generator 11 further includes a code generator 11*d* for generating an intelligent information retrieval program based on the table 11*b* in which the knowledge has been established. The intelligent information retrieval program is generated using Java scripts (the script language jointly developed by Sun Microsystems, Inc. in U.S.A. and Netscape Communications Corp. in U.S.A.) and Java applets (the software parts generated by the object-oriented language "Java" developed for the Internet by Sun Microsystems, Inc. in U.S.A.). The code generator 11*d* incorporates the generated intelligent information retrieval program into a HTML document, thereby producing a retrieval-program-containing document 14. The WWW server 10 has a server software program 12 which sends information contained in a home page 13, the retrieval-program-containing document 14, and a database 15 to the WWW terminal 20. The information in the database 15 includes document information, image information, and audio information, etc.

The WWW terminal 20 has a WWW browser 21. The WWW browser 21 has a function to browse HTML documents and a function to execute Java scripts and Java applets. Java applets are generated as intermediate codes independent of the OS (Operating System) and the MPU (Micro Processing Unit), enabling the interpreter of the WWW browser 21 to absorb differences between OSs and MPUs. Programs such as Java scripts and Java applets that do not depend on the OS and the MPU will hereinafter be referred to as an "intermediate language".

The provider of information at the WWW server 10 generates information to be provided and stores the generated information in the database 15. The provider then generates the retrieval-program-containing document 14 in a HTML format using the functions of the intelligent information retrieval program generator 11. The user downloads the retrieval-program-containing document 14 by selecting certain items from a menu in the home page 13. When the WWW browser 21 executes the retrieval-program-containing document 14, questions and answer alternatives are displayed on a display screen of the WWW terminal 20. The user then inputs answers to the questions. When the user inputs answers to all the questions, information depending on the entered answers is acquired from the database 15, and displayed on the display screen.

A process of generating an intelligent information retrieval program, which is carried out by the intelligent information retrieval program generator 11, will be described below. In the process described below, an intelligent information retrieval program is generated using Java scripts.

Figure 3:
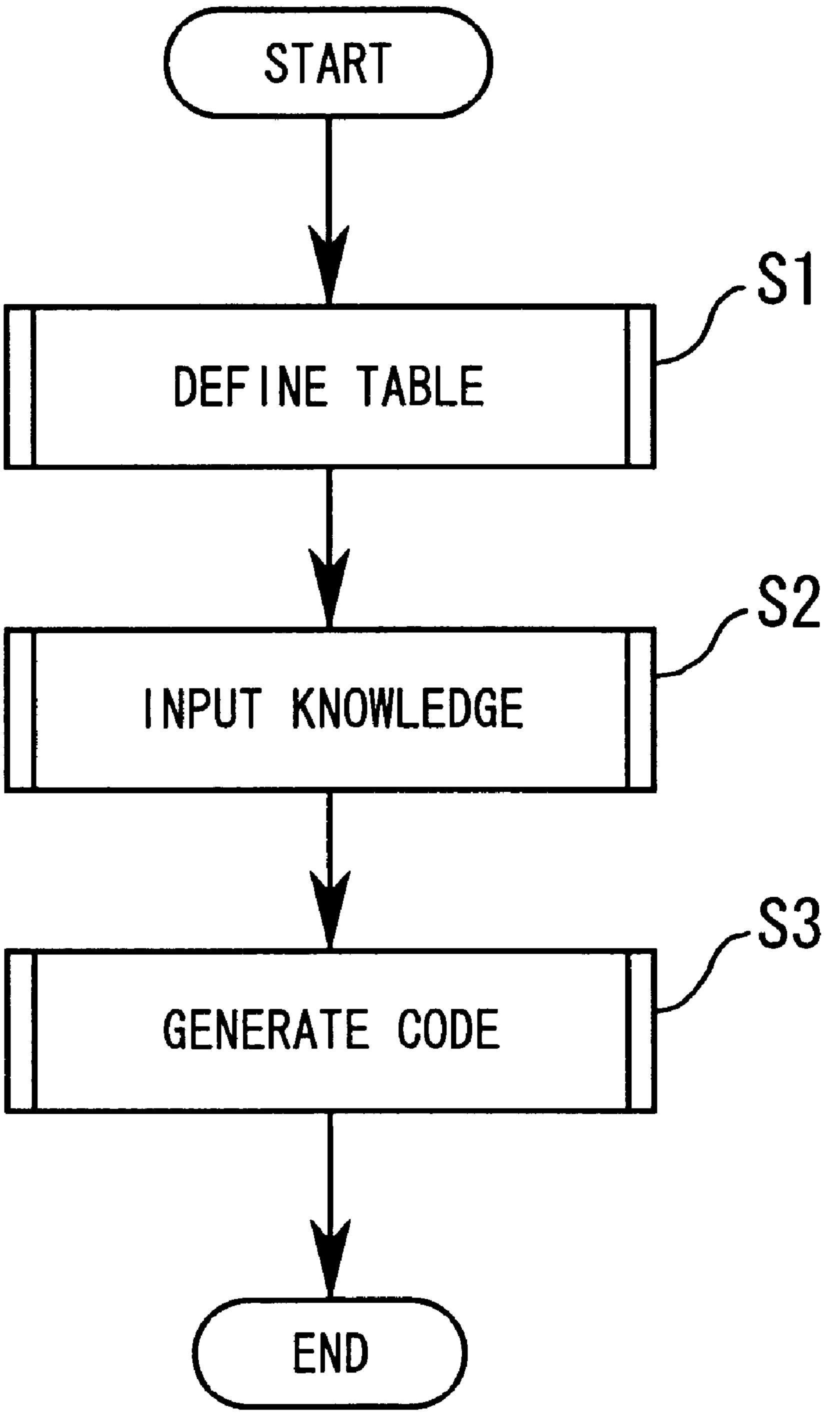
FIG. 3 is a flowchart of a process of generating an information retrieval program.

FIG. 3 is a flowchart showing such a process of generating an intelligent information retrieval program. In the flowchart shown in FIG. 3 and other flowcharts described later on, numerals preceded by a prefix "S" represent step numbers.

[S1] The table defining unit 11*a* defines a table 11*b* of answers to questions and conclusions. Details of this process will be described later on with reference to FIG. 4.

[S2] The knowledge establishing unit 11*c* inputs knowledge into the table 11*b* defined in the step S1. Details of this process will be described later on with reference to FIG. 5.

[S3] The code generator 11*d* encodes the knowledge into Java scripts, and incorporates the Java scripts into a HTML document. Details of this process will be described later on with reference to FIG. 6.

Figure 4:
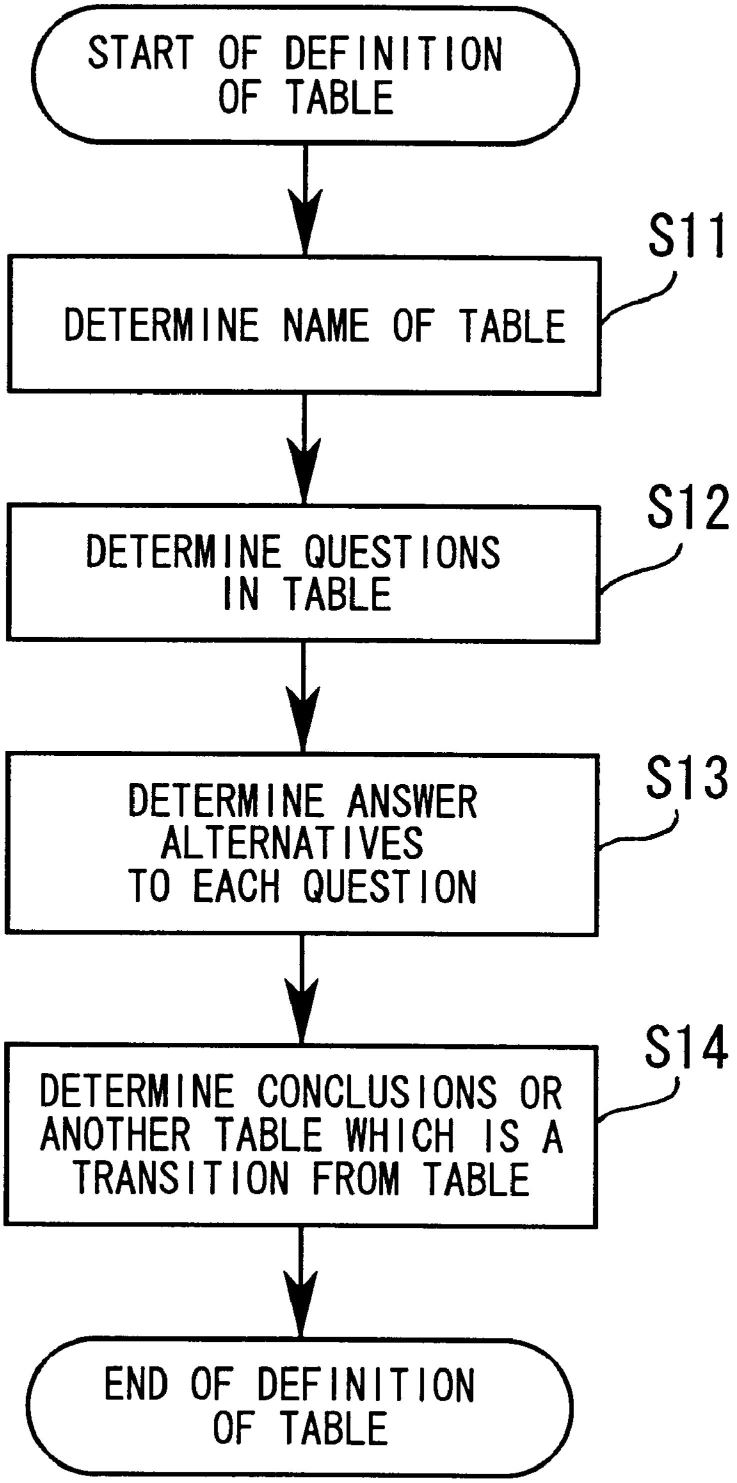
FIG. 4 is a flowchart of details of a process of defining a table.

FIG. 4 is a flowchart showing details of the process of defining the table 11*b*. The process of defining the table 11*b* is carried out by the table defining unit 11*a* based on data inputted by the operator.

[S11] The title of the table which is about to be defined is determined.

[S12] Questions in the table are determined.

[S13] Answer alternatives to each of the questions are determined.

[S14] Conclusions or another table which is a transition from the table is determined. In this manner, the table 11*b* is defined.

Figure 5:
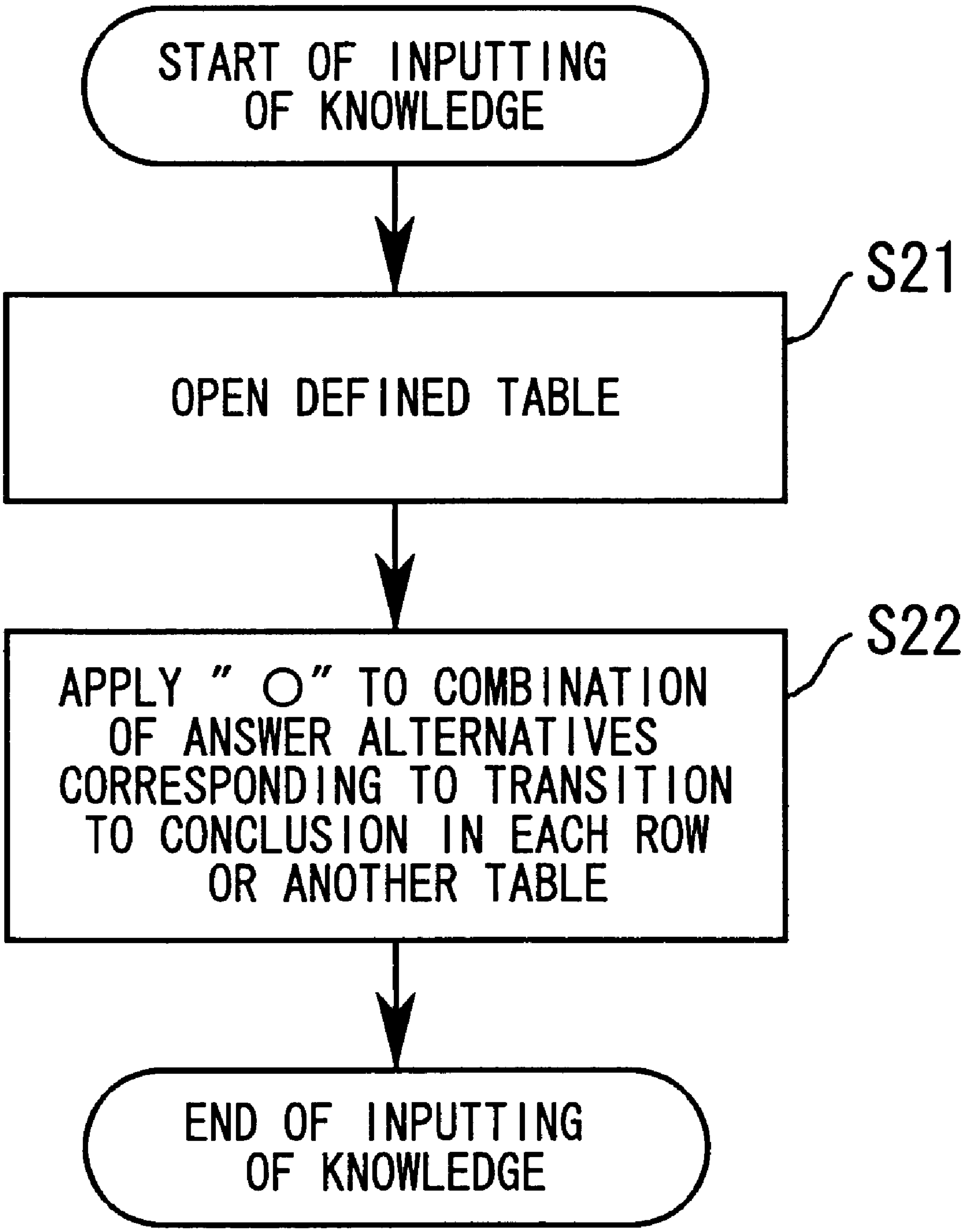
FIG. 5 is a flowchart of details of a process of inputting knowledge.

FIG. 5 is a flowchart showing details of the process of inputting knowledge into the table 11*b*.

[S21] The defined table is opened.

[S22] "○" or "×" is applied to each of the answer alternatives corresponding to the transition to the conclusion in each row or another table. In this manner, the correspondence between a combination of "○" or "×" for all the answer alternatives and the conclusions or another intelligent information retrieval program is determined.

Figure 6:
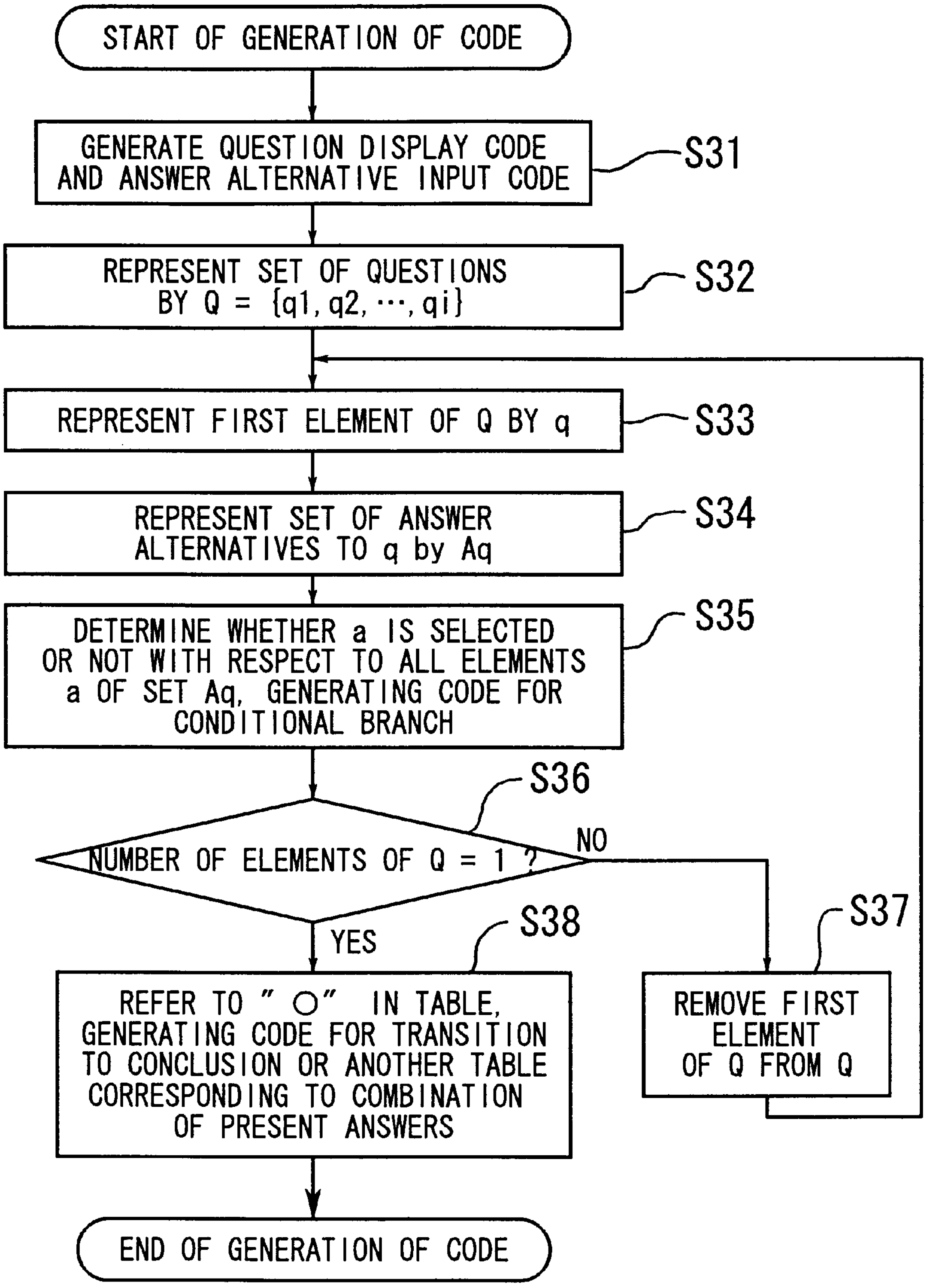
FIG. 6 is a flowchart of details of a process of generating codes.

FIG. 6 is a flowchart showing details of the process of generating codes.

[S31] A question display code and an answer alternative input code are generated.

[S32] A set of questions is represented by Q={q1, q2, . . . , q1}.

[S33] A first element of the set Q is represented by q.

[S34] A set of answer alternatives to the first element q is represented by Aq.

[S35] It is determined whether a is selected or not with respect to all elements a of the set Aq, thereby generating a code for a conditional branch.

[S36] It is determined whether the number of elements of the set Q is 1 or not. If the number of elements is 1, then control proceeds to a step S38. If the number of elements is not 1, then control proceeds to a step S37.

[S37] The first element of the set Q is removed from the set Q, and control returns to the step S33. In this fashion, the steps S33 through S37 are recursively executed with respect to all the elements of the set Q.

[S38] The signs "○" in the table are referred to, generating a code for a transition to a conclusion or another table corresponding to the combination of the present answers. In this manner, a retrieval program corresponding to each table is generated.

If a table is defined and knowledge is inputted through a menu, then such a process is highly convenient as it is free of any input oversights. An example of generating a retrieval-program-containing document using a knowledge editor by defining a table and inputting knowledge through a menu will be described below. In the following example, an intelligent information retrieval program for providing information as to banquet halls to a user who is looking for a banquet hall.

Figure 7:
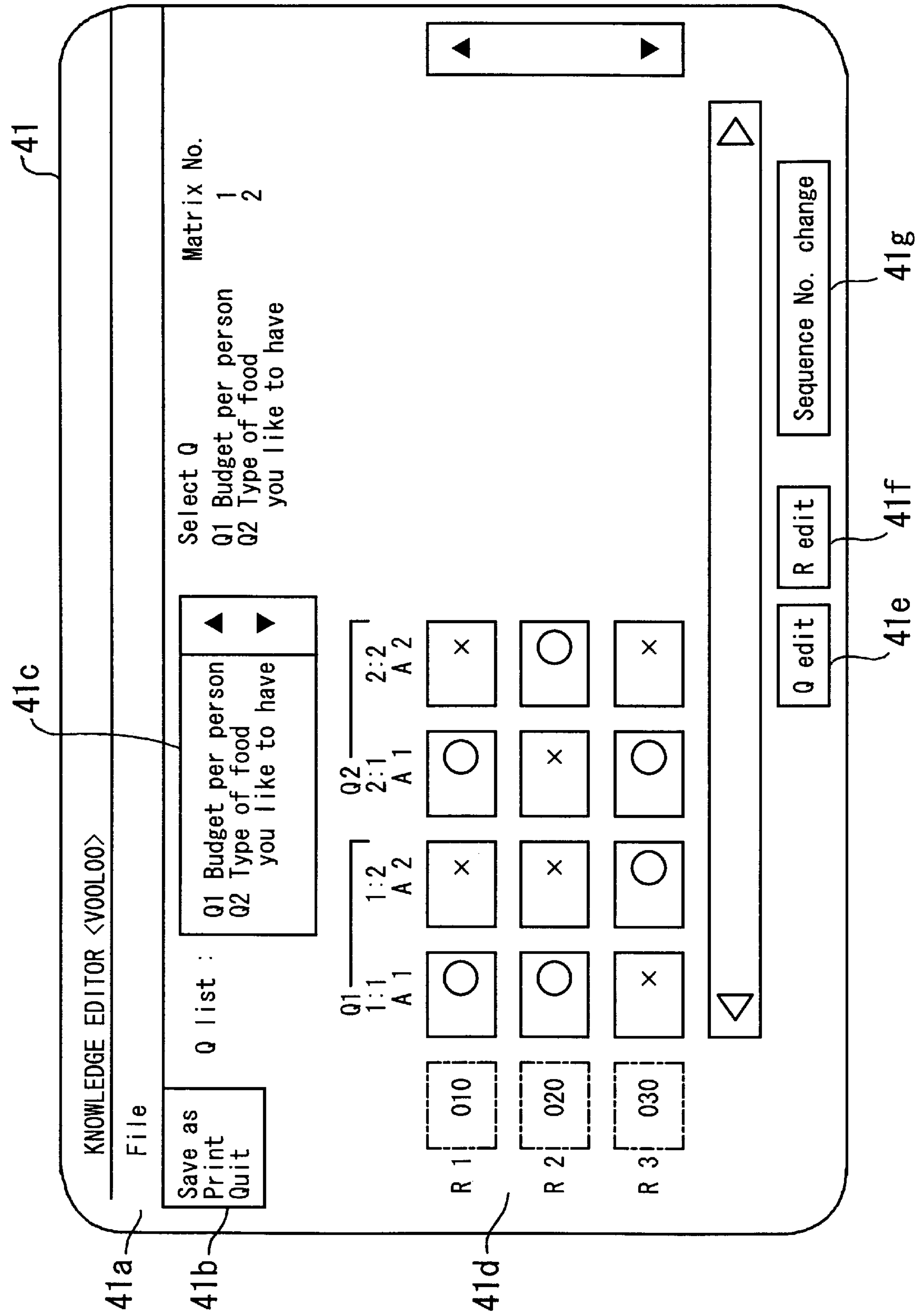
FIG. 7 is a view of a displayed image of a knowledge editor.

FIG. 7 shows a displayed image of a knowledge editor. When the knowledge editor is started, a main window 41 is displayed. The main window 41 has a menu bar 41*a* in which the menu name "File" is displayed. When "File" is selected, a pull-down menu 41*b* is opened therebelow. The pull-down menu 41*b* contains commands "Save as", "Print", and "Quit". If "Save as" is executed, then knowledge information which is currently generated is saved under an arbitrary file name. If "Print" is executed, then knowledge information is printed. If "Quit" is executed, then the knowledge editor is finished.

The main window 41 contains a display area 41c for displaying a list of questions (Q list). The display area 41c displays the contents of questions inputted in a Q editing window (described later on) together with question numbers. To the right of the display area 41c, there is displayed a corresponding relationship between question numbers (Q1, Q2) and matrix numbers. The matrix numbers are serial numbers allotted to defined tables.

The main window 41 also contains, in its central area, a matrix table 41d of answer alternatives and conclusions. Above the matrix table 41d, there are displayed question numbers (Q1, Q2) of the defined questions, numbers (1:1, 1:2, 2:1, 2:2) indicative of alternatives for each of the questions, and answer numbers (A1, A2). To the left of the matrix table 41d, there are displayed conclusion numbers (R1, R2, R3) and sequence numbers (010, 020, 030) of the conclusions. The matrix table 41d contains true "○" and false "×" with respect to each of the answer alternatives for reaching conclusions.

The main window 41 further includes, displayed below the matrix table 41d, a "Q edit" button 41e for inputting questions, an "R edit" button 41f for inputting conclusions, and a "sequence No. change" button 41g for changing sequence numbers. When the "Q edit" button 41e is clicked with a mouse, a Q editing window is newly displayed. When the "R edit" button 41f is clicked with the mouse, an R editing window is newly displayed. An A editing window can further be displayed from the Q editing window. When the "sequence No. change" button 41g is clicked with the mouse, the sequence numbers applied to the conclusions can be changed, and the conclusions are rearranged in the order of the changed sequence numbers.

Figure 8:
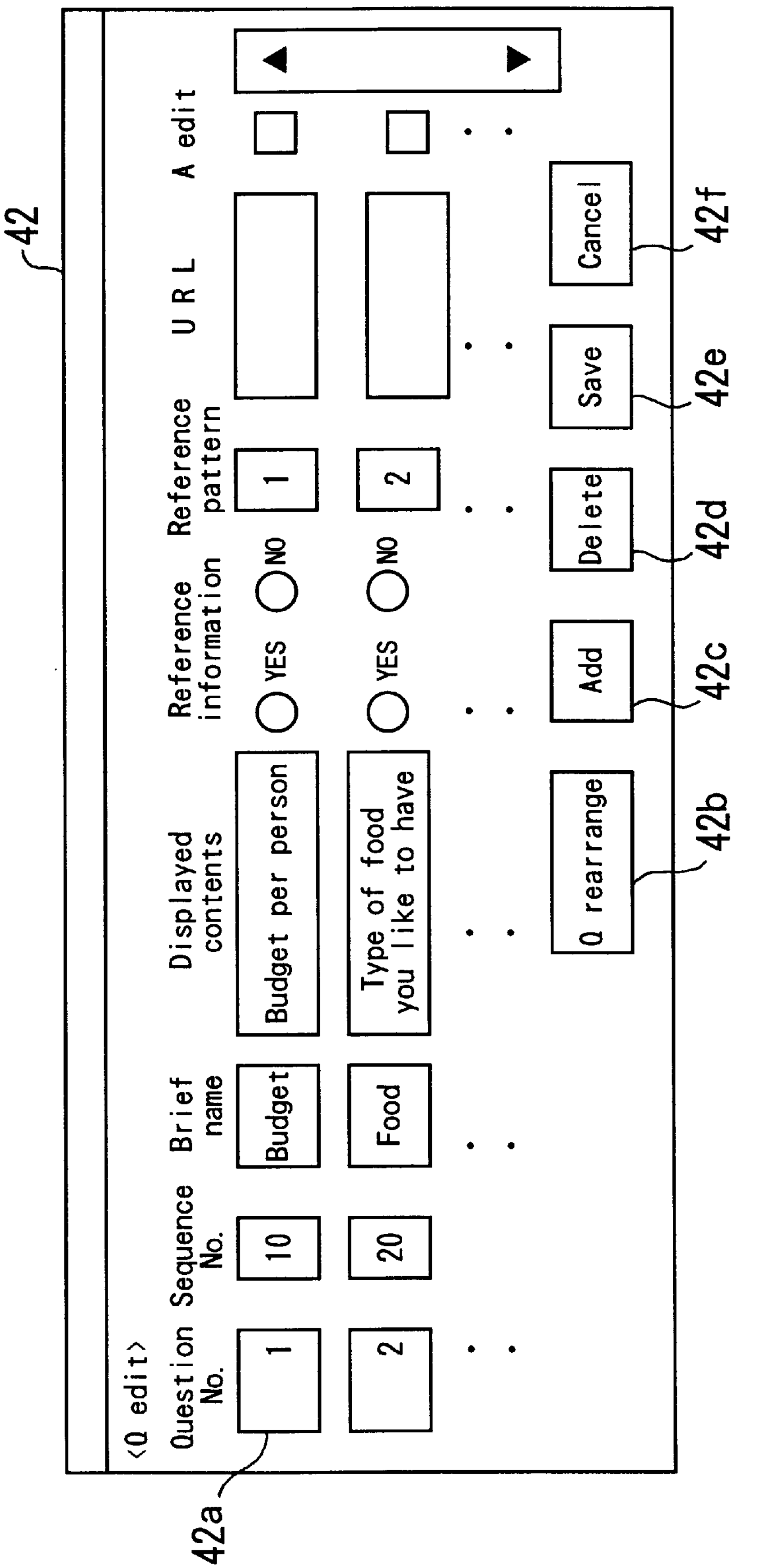
FIG. 8 is a view of a Q editing window.

FIG. 8 shows the Q editing window. The Q editing window, which is denoted by 42 in FIG. 8, has a question inputting area 42a which contains input items "Question No.", "Sequence No.", "Brief name", "Displayed contents", "Reference information", "Reference pattern", "URL", and "A edit".

The input item "Question No." represents an identification number assigned to a registered question. The input item "Sequence No." represents a sequence number assigned to a question. When a new question is inputted, it is automatically given a sequence number in tens. The input item "Brief name" represents an abbreviated name given to a question to make the content of the question readily understandable. The input item "Displayed contents" represents a specific content of a question. The input item "Reference information" represents whether there is reference information or not as indicated by a check box. The input item "Reference pattern" represents an identification number showing the type of a reference pattern. There are three types of patterns available. According to the first pattern (identification number "1"), alternatives are displayed by list boxes. According to the second pattern (identification number "2"), alternatives are displayed by image data. According to the third pattern (identification number "3"), another window is displayed for selecting an answer. The input item "URL" represents an area for inputting a URL of another document if a reference pattern exists as the other document. The input item "A edit" includes a button for opening the A editing window for establishing an answer to a question. If an A editing process has already been carried out, then a check mark is displayed in the button.

The Q editing window 42 also contains an array of "Q rearrange", "Add", "Delete", "Save", and "Cancel" buttons 42b~42f in a lower area thereof. When the "Q rearrange" button 42b is clicked with the mouse, questions are rearranged into the sequence of the "Sequence No." at the time. If the sequence of questions is to be changed, then the "Sequence No. " is changed into a desired number, and the "Q rearrange" button 42b is clicked with the mouse. When the "Add" button 42c is clicked with the mouse, a new question is added to a position which is being indicated at the time. When the "Delete" button 42d is clicked with the mouse, the question which is being indicated at the time is deleted. When the "Save" button 42e is clicked with the mouse, the data established on the Q editing window 42 are saved, and the content thereof is reflected in the matrix table 41d in the main window 41. When the "Cancel" button 42f is clicked with the mouse, all the data established on the Q editing window 42 are cleared.

Figure 9:
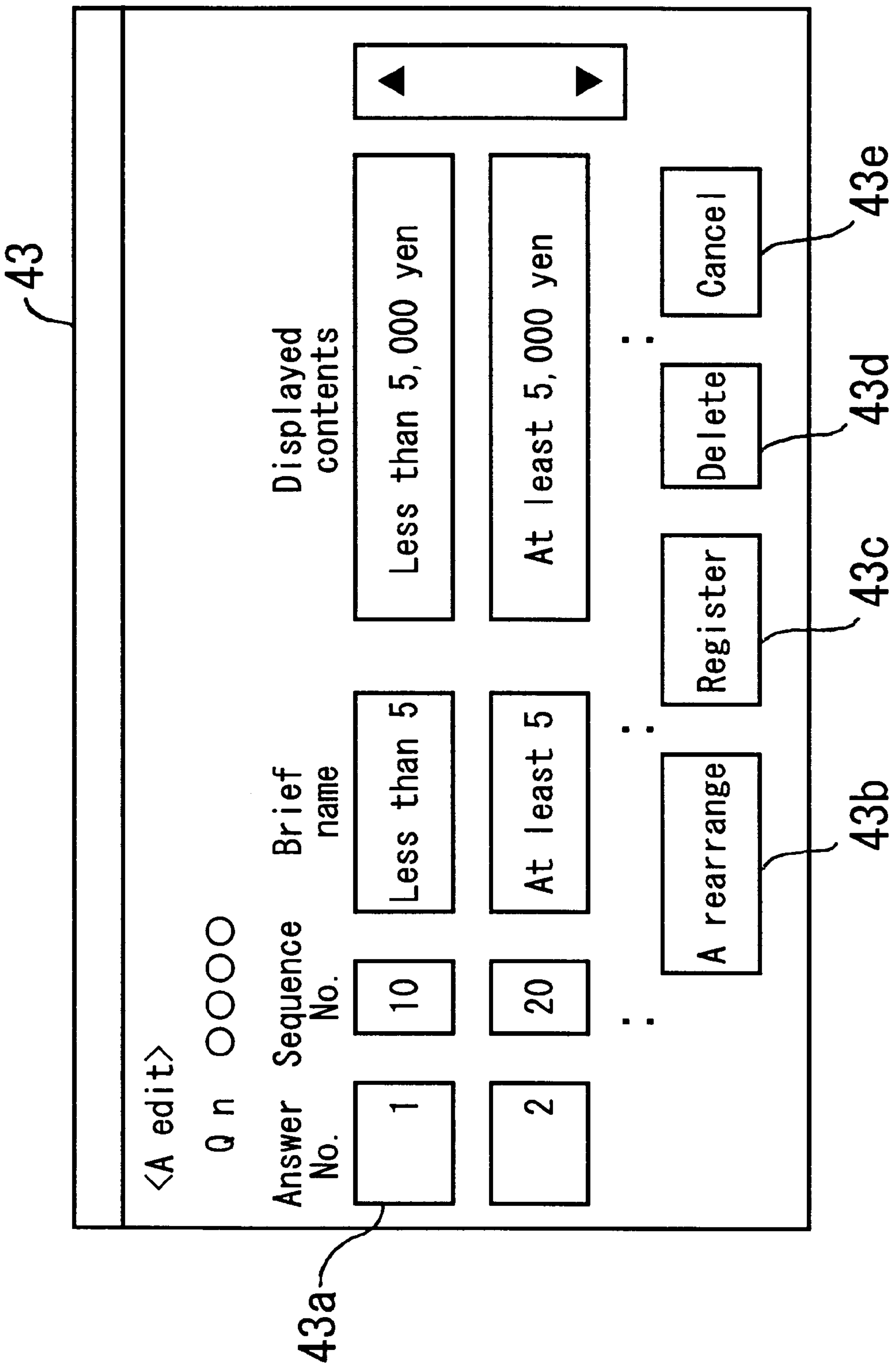
FIG. 9 is a view of an A editing window.

FIG. 9 shows the A editing window. The A editing window, which is denoted by 43 in FIG. 9, contains "Question No." of a corresponding question displayed in an upper area thereof and also an answer inputting area 43a displayed in a central area thereof. The answer inputting area 43a contains input items "Answer No.", "Sequence No.", "Brief name", and "Displayed contents". These input items are identical to the input items "Answer No.", "Sequence No.", "Brief name", and "Displayed contents" in the question inputting area 42a of the Q editing window 42.

The A editing window 43 also contains an array of "A rearrange", "Register", "Delete", and "Cancel" buttons 43b~43e in a lower area thereof. The functions of the "A rearrange", "Delete", and "Cancel" buttons 43b, 43d, 43e are identical respectively to the functions of the "Q rearrange", "Delete", and "Cancel" buttons 42b, 42d, 42f in the Q editing window 42. When the "Register" button 43c is clicked with the mouse, the data established in the A editing window 43 are registered as an answer to the corresponding question.

Figure 10:
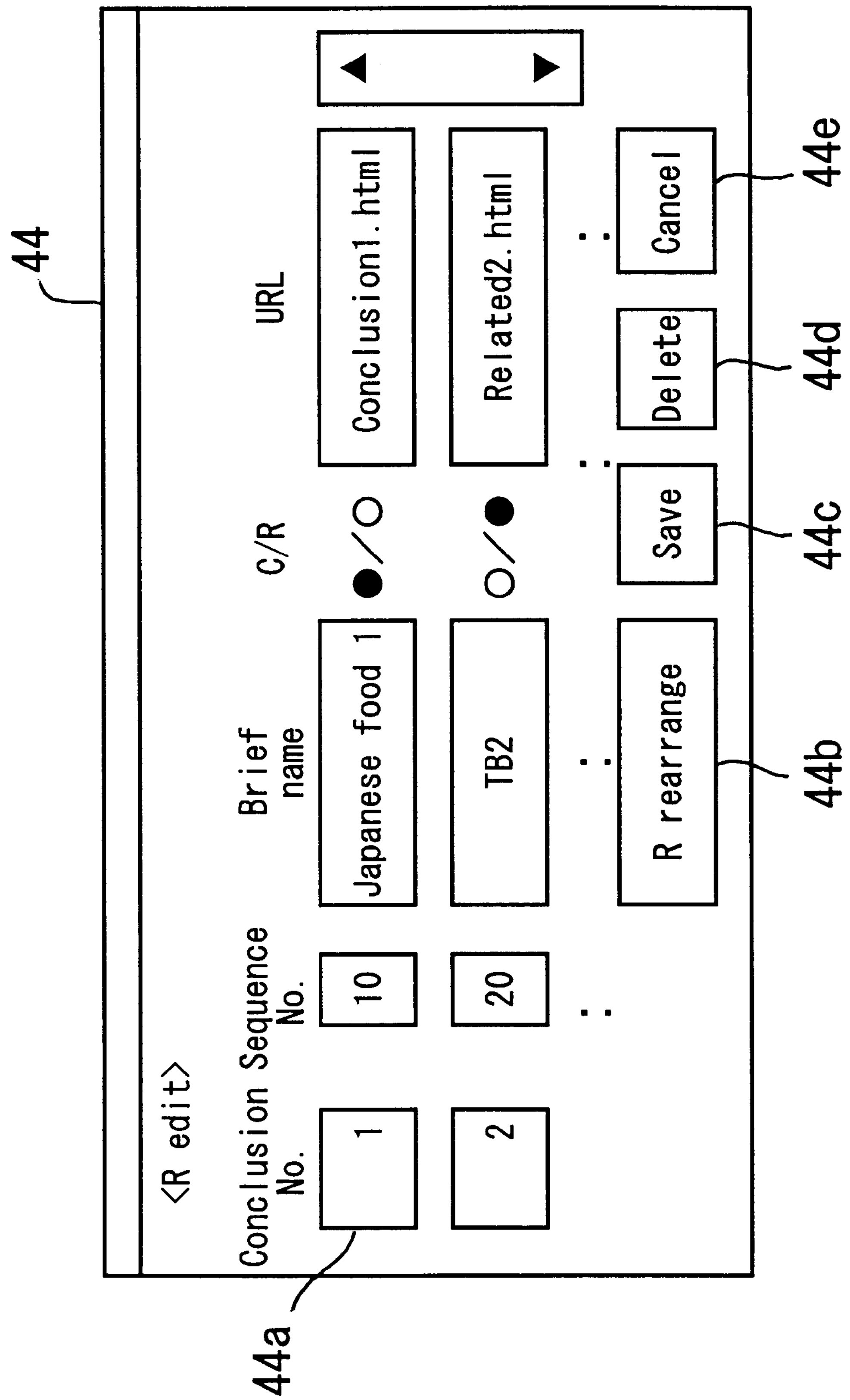
FIG. 10 is a view of an R editing window.

FIG. 10 shows the R editing window. The R editing window, which is denoted by 44 in FIG. 10, contains conclusion inputting area 44a displayed in a central area thereof. The conclusion inputting area 44a contains input items "Conclusion No.", "Sequence No.", "Brief name", "Conclusion or Related table" (displayed as "C/R" in the window), and "URL". The input items "Conclusion No.", "Sequence No.", and "Brief name" are identical to the input items "Answer No.", "Sequence No.", and "Brief name" in the question inputting area 42a of the Q editing window 42. The input item "Conclusion or Related table" has two check boxes, one representing the immediate display of a conclusion and the other representing a further interactive process using another related table. The input item "URL" represents an area for inputting a URL of information of a conclusion or an URL of a related table.

The R editing window 44 also contains an array of "R rearrange", "Save", "Delete", and "Cancel" buttons 44b~44e in a lower area thereof. The functions of the "R rearrange", "Save", "Delete", and "Cancel" buttons 44b~44e are identical respectively to the functions of the "Q rearrange", "Save", "Delete", and "Cancel" buttons 42b, 42e, 42d, 42f in the Q editing window 42.

When necessary items are inputted and saved in the Q editing window 42, the A editing window 43, and the R editing window 44, a Q table, an A table, and an R table are generated in the intelligent information retrieval program generation system 1, and a matrix table is generated from these Q, A, and R tables in the intelligent information retrieval program generation system 1.

FIG. 11 shows the Q, A, and R tables and the matrix table which are generated in the intelligent information retrieval program generation system 1. The Q table, denoted by 51 in FIG. 11, contains items "Q No.", "Q brief name", "Q displayed name", "Reference pattern", and "QURL" registered therein. The A table, denoted by 52 in FIG. 11, contains items "Q No.", "A No.", "Sequence No.", "A brief name", and "A display name" registered therein. The R table, denoted by 53 in FIG. 11, contains items "R No.", "Sequence No.", "R brief name", "RURL", and "R related table" registered therein.

The matrix table, denoted by 54 in FIG. 11 is generated from the information contained in the Q, A, and R tables 51, 52, 53. The matrix table 54 represents a corresponding relationship between answers and conclusions. The conclusions are given "Sequence No.". Each of the answers is assigned a two-figure number, the tenth digit representing "Question No." and the unit digit representing "Answer No.". The matrix table 54 is displayed as the matrix table 41*d* in the main window 41 shown in FIG. 7. When knowledge is inputted as "○" or "×" in the main window 41, a corresponding value is established in the matrix table 54. Specifically, when knowledge is inputted as "○", a corresponding value "1" is established in the matrix table 54, and when knowledge is inputted as "×", a corresponding value "0" is established in the matrix table 54. In this manner, the corresponding relationship between the entered knowledge and the conclusions or another table is determined. The matrix table 54 in which knowledge has been inputted will hereinafter be referred to as tabular knowledge data.

Figure 12:
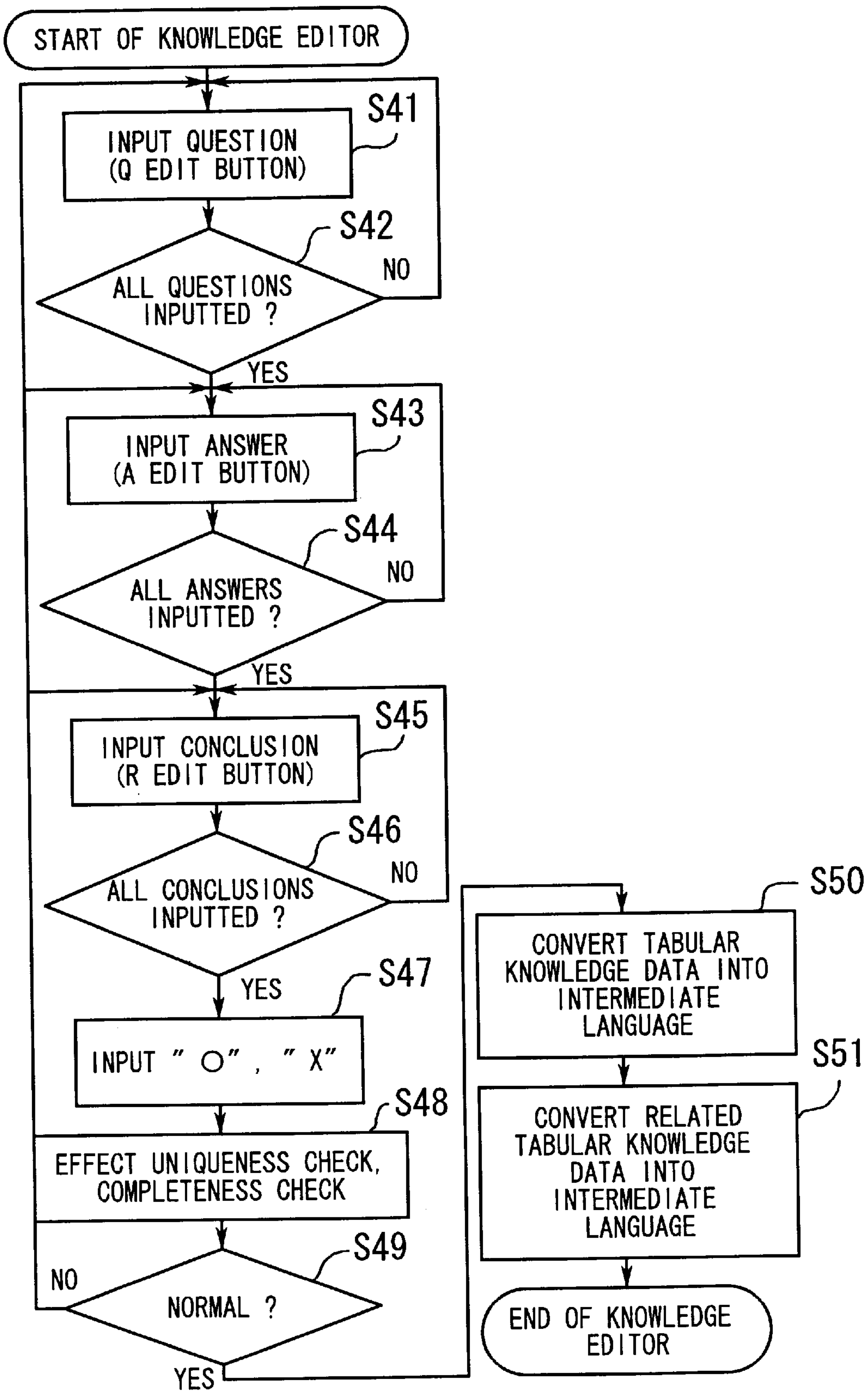
FIG. 12 is a flowchart of a process of generating an intelligent information retrieval program with the knowledge editor.

FIG. 12 is a flowchart of a process of generating an intelligent information retrieval program with the knowledge editor. The process shown in FIG. 12 is carried out by the operator while the knowledge editor is providing an operating environment for the operator and storing and analyzing various items of information that have been entered.

[S41] The operator inputs a question. If, at this time, the Q editing window 42 is closed, then the operator presses the "Q edit" button 41*e* to open the Q editing window 42, and inputs a question. Specifically, the operator inputs "Question No.", "Sequence No.", "Brief name", "Displayed contents", "Reference information", and "Reference pattern". If necessary, the operator also inputs "URL" of the reference information. The knowledge editor stores information relative to the entered question.

[S42] The operator determines whether all questions have been inputted or not. If there is a question which has not been inputted, control goes back to the step S41. If all questions have been inputted, then control goes to a step S43.

[S43] The operator inputs an answer. If, at this time, the A editing window 43 is closed, then the operator presses an "A edit" button to open the A editing window 43, and inputs an answer. Specifically, the operator inputs "Answer No.", "Sequence No.", "Brief name", and "Displayed contents". The knowledge editor stores information relative to the entered answer.

[S44] The operator determines whether all answers have been inputted or not. If there is an answer which has not been inputted, control goes back to the step S43. If all answers have been inputted, then control goes to a step S45.

[S45] The operator inputs a conclusion. If, at this time, the R editing window 44 is closed, then the operator presses the "R edit" button 41*f* to open the R editing window 44, and inputs a conclusion. Specifically, the operator inputs "Conclusion No.", "Sequence No.", "Brief name", "Conclusion or Related table", and "URL". The knowledge editor stores information relative to the entered conclusion.

[S46] The operator determines whether all conclusions have been inputted or not. If there is an answer which has not been inputted, control goes back to the step S45. If all answers have been inputted, then control goes to a step S47. At this time, the matrix table 41*d* has been generated in the main window 41 of the knowledge editor.

[S47] The operator inputs knowledge. Specifically, the operator enters "○" and "×" in the matrix table 41*d* which has been generated in the above process up to the step S46.

[S48] The knowledge editor then effects a uniqueness check and a completeness check on the defined matrix table 41*d* and the knowledge. The uniqueness check is a checking process for determining whether one conclusion can be derived from an arbitrary pattern of answers. The completeness check is a checking pattern for determining whether information to be inputted is consistent or not.

[S49] The operator determines whether the tabular knowledge data are normal or not based on the results of the checks effected in the step S48. If the tabular knowledge data are inconsistent, then control goes back to the step S41, S43, or S45 depending on the judgment of the operator. If the tabular knowledge data are normal, then control proceeds to a step S50.

[S50] The knowledge editor converts the tabular knowledge data into the intermediate language (Java scripts and Java applets).

[S51] The knowledge editor converts related tabular knowledge data into the intermediate language. Specifically, if another table is indicated in a conclusion, the other table is converted into the intermediate language. The specific process carried out in each of the steps S50, S51 is the process of generating codes shown in FIG. 6.

FIG. 13 shows, by way of example, the generated tabular knowledge data. The tabular knowledge data, denoted by 11*ba*, which is referred to as "tablel", contain two questions "Q1", "Q2" each having two answer alternatives "A1", "A2", and two conclusions "result1", "result2" and two other tables "table2", "table3" which are defined with respect to the two questions "Q1", "Q2". The tabular knowledge data, denoted by 11*bb*, which is referred to as "table2", contain a question "Q1" having two answer alternatives "A1", "A2", and two conclusions "result3", "result4" which are defined with respect to the question "Q1". The tabular knowledge data, denoted by 11*bc*, which is referred to as "table3", contain a question "Q1" having two answer alternatives "A1", "A2", and two conclusions "result5", "result6" which are defined with respect to the question "Q1".

Based on the tabular knowledge data, codes are generated to produce a HTML document which contains an intelligent information retrieval program generated using Java scripts.

FIG. 14 shows, by way of example, a document containing an intelligent information retrieval program that has been generated based on the tabular knowledge data referred to as "table1". In FIG. 14, an area 61 which is present between tags <SCRIPT>, </SCRIPT> is a description of a program generated using Java scripts. The program description contains conditional branches "if . . . else" based on whether an answer alternative is selected or not. A code for such a conditional branch is generated in the step S35 shown in FIG. 6. A code indicated by "url=" . . . " shows a destination, represented by an URL, of a transition to a conclusion or a table. A code for indicating the destination is generated in the step S38 shown in FIG. 6.

In FIG. 14, an area 62 which is present between tags <BODY>, </BODY> is a description of a code for displaying questions and answer alternatives and selectively receiving answers. This code is generated in the step S31 shown in FIG. 6.

FIG. 15 shows, by way of example, a document containing an intelligent information retrieval program that has been generated based on the tabular knowledge data referred to as "table2". In FIG. 15, an area 63 which is present between tags <SCRIPT>, </SCRIPT> is a description of a program generated using Java scripts, and an area 64 which is present between tags <BODY>, </BODY> is a description of a code for displaying questions and answer alternatives and selectively receiving answers.

FIG. 16 shows, by way of example, an HTML document of a conclusion. The displayed content of a conclusion is described in an area 65 which is present between tags <BODY>, </BODY>. The example shown in FIG. 16 illustrates the displayed content of "Conclusion 5". Other conclusions can be generated similarly. The conclusions may contain image data and audio data.

Figure 17:
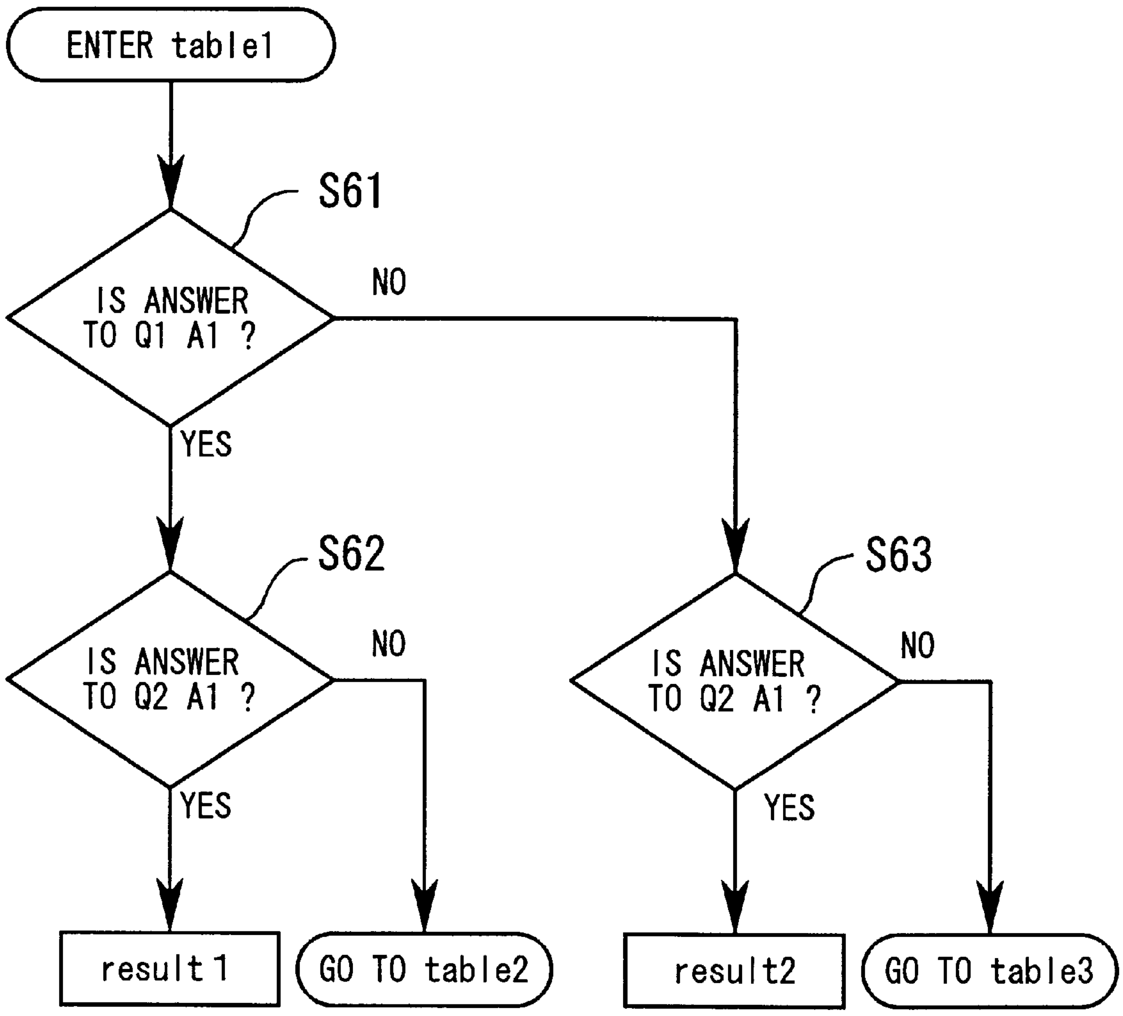
FIG. 17 is a flowchart illustrative of a knowledge structure of the intelligent information retrieval program that has been generated based on the tabular knowledge data referred to as "table1"

FIG. 17 is a flowchart showing a knowledge structure of the intelligent information retrieval program that has been generated based on the tabular knowledge data referred to as "table1".

[S61] It is determined whether the answer to the question Q1 in "table1" is A1 or not. If the answer is A1, then control goes to a step S62, and if the answer is not A1, then control goes to a step S63.

[S62] It is determined whether the answer to the question Q2 in "table1" is A1 or not. If the answer is A1, then "result1" is used as the conclusion, and if the answer is not A1, then control goes to a retrieval program generated based on "table2".

[S63] It is determined whether the answer to the question Q2 in "table1" is A1 or not. If the answer is A1, then "result2" is used as the conclusion, and if the answer is not A1, then control goes to a retrieval program generated based on "table3".

Figure 18:
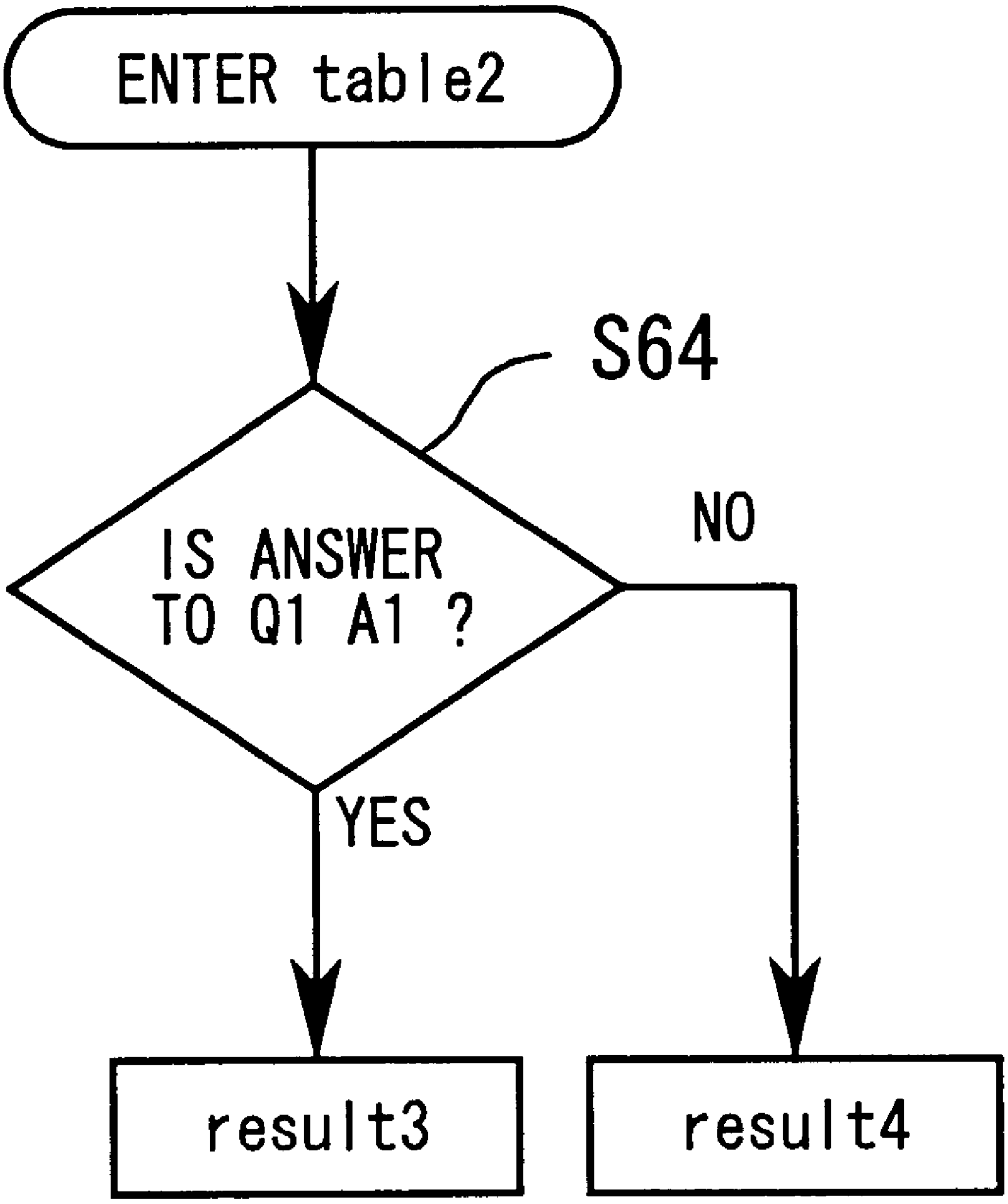
FIG. 18 is a flowchart illustrative of a knowledge structure of the intelligent information retrieval program that has been generated based on the tabular knowledge data referred to as "table2"

FIG. 18 is a flowchart showing a knowledge structure of the intelligent information retrieval program that has been generated based on the tabular knowledge data referred to as "table2".

[S64] It is determined whether the answer to the question Q1 in "table2" is A1 or not. If the answer is A1, then "result3" is used as the conclusion, and if the answer is not A1, then "result4" is used as the conclusion.

Figure 19:
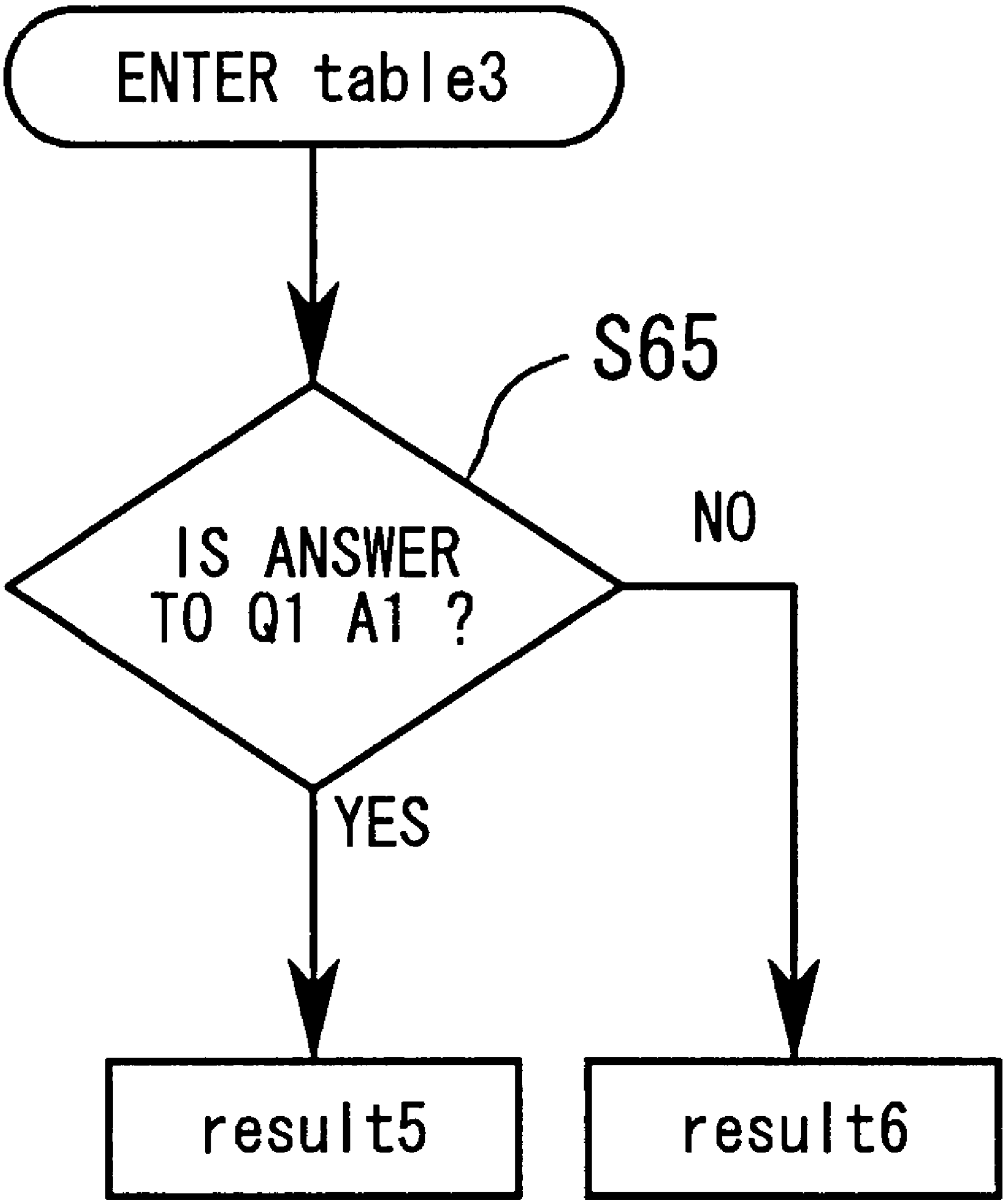
FIG. 19 is a flowchart illustrative of a knowledge structure of the intelligent information retrieval program that has been generated based on tabular knowledge data referred to as "table3"

FIG. 19 is a flowchart showing a knowledge structure of the intelligent information retrieval program that has been generated based on the tabular knowledge data referred to as "table3".

[S65] It is determined whether the answer to the question Q1 in "table3" is A1 or not. If the answer is A1, then "result5" is used as the conclusion, and if the answer is not A1, then "result6" is used as the conclusion.

In the manner described above, an HTML document which contains an intelligent information retrieval program generated using Java scripts is generated by the knowledge editor. The home page 13 provided by the WWW server 10 and the generated HTML document are related to each other for thereby providing a user who has accessed the home page 13 with an intelligent information retrieval capability. Examples of displayed images at the WWW terminal 20 which are provided with services of the generated intelligent information retrieval program will be described below.

Figure 20:
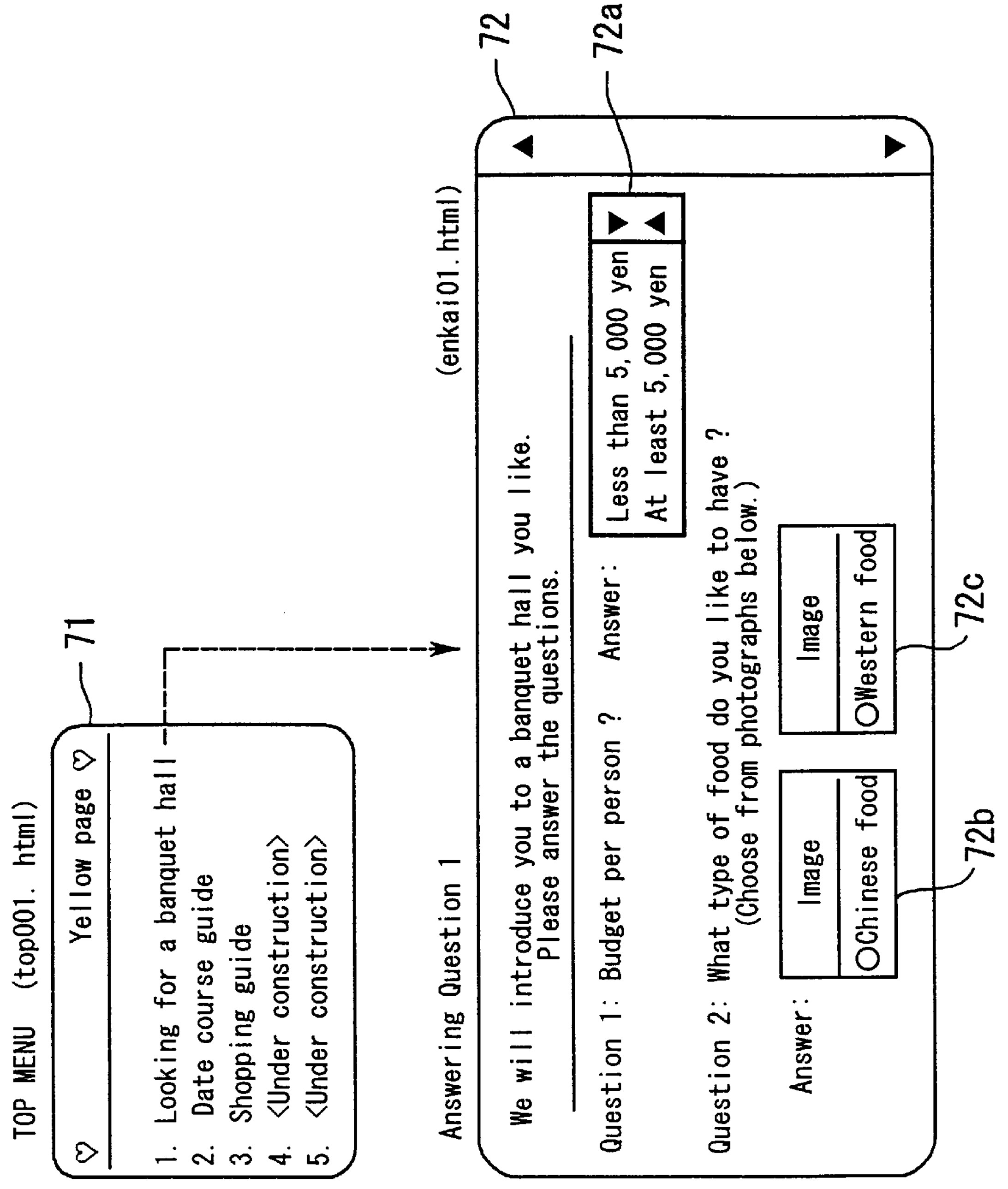
FIG. 20 is a view showing, by way of example, a transition from a home page to a document containing the intelligent information retrieval program.

FIG. 20 shows, by way of example, a transition from the home page to the document containing the intelligent information retrieval program. When the user accesses the home page 13 using the WWW browser 21, a top menu 71 is displayed on the display screen of the WWW terminal 20. In the example shown in FIG. 20, the displayed menu 71 contains items "1. Looking for a banquet hall", "2. Date course guide", "3. Shopping guide", etc. When the item "1. Looking for a banquet hall" is selected, the document containing the intelligent information retrieval program is downloaded, and an image 72 of questions and answers to look for a banquet hall is displayed on the display screen.

The displayed image 72 contains "Question 1" and "Question 2". The user first selects an answer to "Question 1: How much is the budget per person?". Specifically, the user selects an answer from a group of answers displayed in a list box 72*a* positioned to the right of the displayed content of "Question 1". In this example, the list box 72*a* contains two answers, i.e., "Less than 5000 yen" and "At least 5000 yen".

Figure 21:
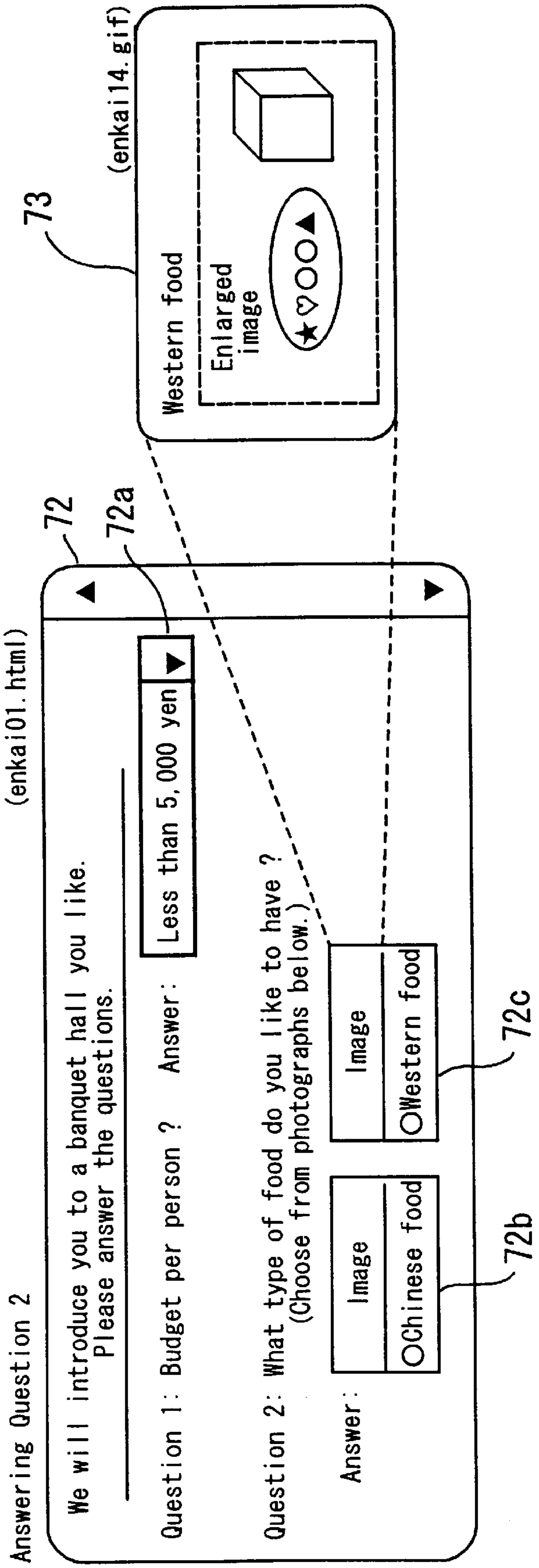
FIG. 21 is a view showing, by way of example, how an answer is made to "Question 2"

Then, the user selects an answer to "Question 2: What kind of food do you like?" FIG. 21 shows how an answer is made to "Question 2". Below the displayed content of "Question 2", there are displayed answer alternatives each comprising image data such as a photograph and a food description. The image data can be displayed on an enlarged scale. In this example, the answer alternatives include an answer 72*b* for Chinese food and an answer 72*c* for Western food. The answers 72*b*, 72*c* are associated with respective check boxes, and the user checks one of the check boxes for the food which the user likes.

Figure 22:
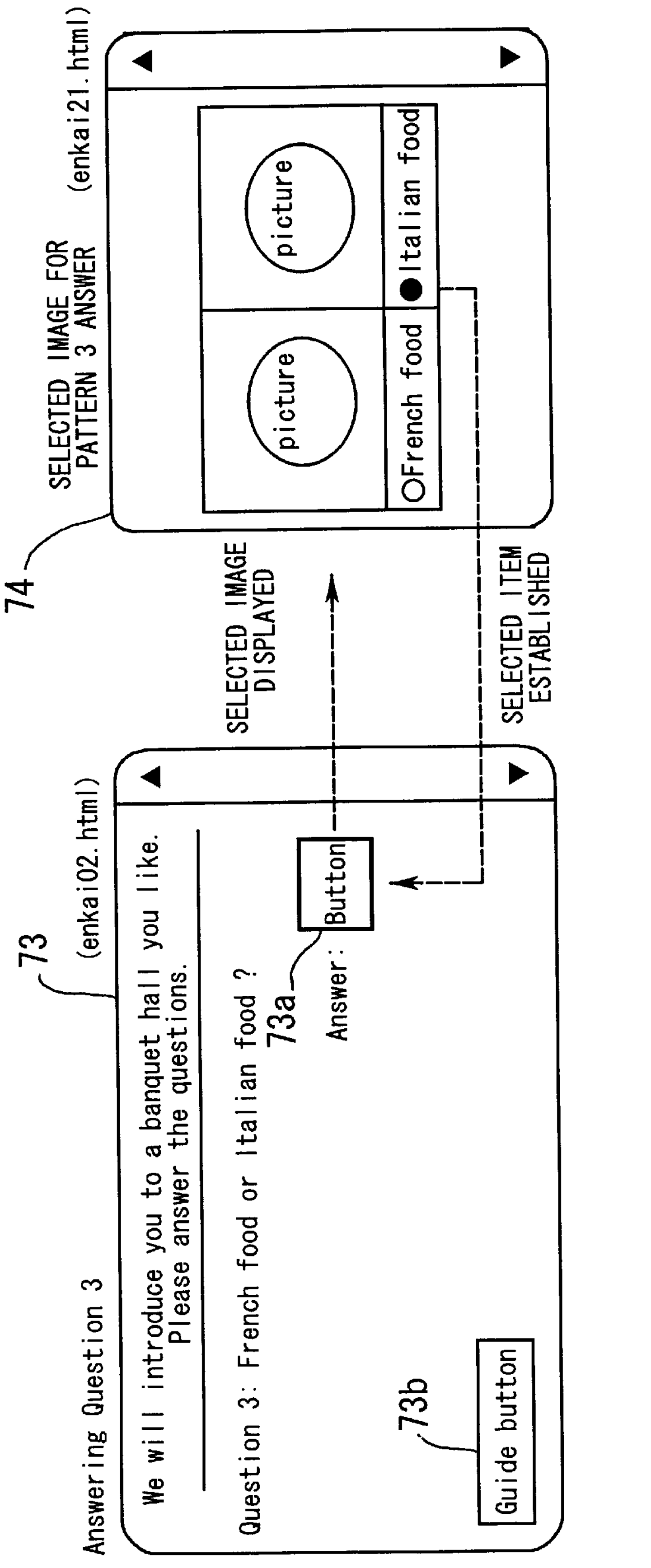
FIG. 22 is a view showing, by way of example, how an answer is made to "Question 3"

If the Western food is chosen, then a selection image 73 containing "Question 3: Do you like French food or Italian food?" is displayed for the user to select a type of Western food. FIG. 22 shows how an answer is made to "Question 3". The selection image 73 contains an answer button 73*a* displayed below the displayed content of "Question 3". When the user presses the answer button 73*a*, an answer selection image 74 is displayed on the display screen. The answer selection image 74 contains answer alternatives each comprising image data such as a photograph and a food description. When the user selects an answer in the answer selection image 74, the answer selection image 74 changes back to the selection image 73.

When the user then presses a guide button 73*b* in the selection image 73, introduction information relative to a restaurant as a banquet hall is displayed as a conclusion on the basis of the answers which the user has inputted to the three questions described above. FIG. 23 shows, by way of example, a displayed image 76 of such a conclusion. In the example shown in FIG. 23, the displayed image 76 contains the image of an interior of the restaurant, a map showing the location of the restaurant, and detailed information of the restaurant. The detailed information includes the name of the restaurant, the style of cooking, business hours, telephone number, the price of package food, regular holiday, and special benefits.

The displayed image 76 also contains a button 76*a* for returning to the top menu 71 below the introduction information relative to the restaurant. Pressing the button 76*a* immediately brings the user back to the top menu 71.

Figure 24:
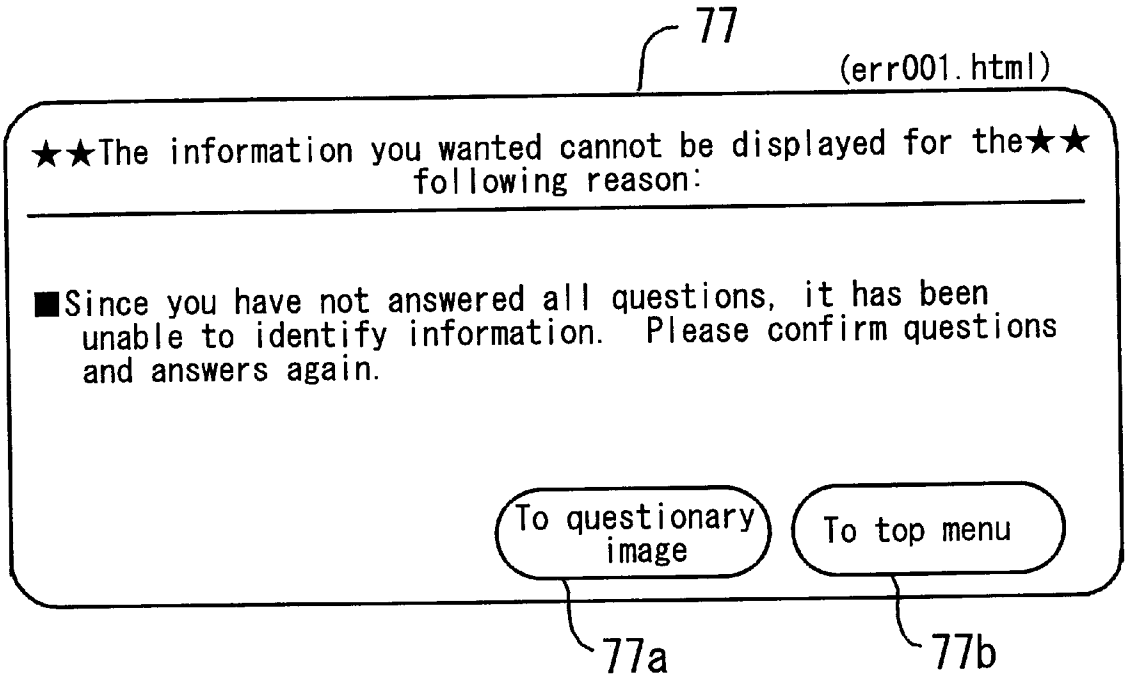
FIG. 24 is a view showing a displayed image of an announcement which is made when answers are incomplete.

If answers are incomplete and no conclusion can be formed, an announcement that desired information cannot be displayed is displayed. FIG. 24 shows a displayed image 77 of an announcement which is made when answers are incomplete. The displayed image 77 contains a message indicating that no desired information can be displayed and a reason why no desired information can be displayed. The displayed image 77 contains in its lower area a button 77*a* for going to a questionary image and a button 77*b* for going to a top menu. When the button 77*a* is pressed, the displayed image 77 changes back to the image 72 of questions and answers. When the button 77*b* is pressed, the displayed image 77 changes back to the top menu 71.

In the manner described above, an intelligent information retrieval program can easily be generated in a tabular form. Since the generated intelligent information retrieval program is incorporated in an HTML document, it can be downloaded through the Internet to a WWW terminal, and desired information can be retrieved on an interactive basis at the WWW terminal using the intelligent information retrieval program.

In the above embodiment, it has been described that an intelligent information retrieval program is generated using Java scripts. However, an intelligent information retrieval program may be generated with Java. If an intelligent information retrieval program is generated with Java, then it is necessary to compile source codes into Java applets. To incorporate Java applets into an HTML document, the names of the Java applets, the sizes of the Java applets, and arguments to be passed to the Java applets may be indicated in the HTML document.

While only one conclusion is drawn from answers to a set of questions in the illustrated embodiment, a plurality of conclusions may be drawn from the answers. According to such a modifications, a plurality of conclusions are simultaneously displayed using a frame division function of a WWW browser.

In the intelligent information retrieval program generation system according to the present invention, as described above, when answer conditions are established in a conclusion determining table of answer alternatives to questions and conclusions, there is generated a document which incorporates an intelligent information retrieval program that effects processing based on the conclusion determining table. Therefore, it is possible to easily generate an intelligent information retrieval program which is applicable to a wide-area information network.

In the intelligent information retrieval system according to the present invention, a document having a logic structure according to a predetermined information description language and incorporating an intelligent information retrieval program is stored in a retrieval-program-containing document storage means, and the document is browsed and the intelligent information retrieval program is executed by a structured document browsing means. Consequently, intelligent information can be retrieved at a terminal where such intelligent information should be received.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for generating a program providing an intelligent information retrieval function, said apparatus comprising:

means for defining a table comprising data indicating questions to be answered by a user, answer alternatives for the questions, and conclusion information to be correlated to the answer alternatives;

means for displaying the table and establishing answer conditions in the table responsive to inputs for the answer alternatives, the answer conditions correlating the conclusion information to the answer alternatives; and means for generating the program based on the table and incorporating the program into a document, whereby the program presents the questions to a user of the document, receives answers input by the document user as responses to the questions, and displays conclusions responsive to the received answers based on the answer conditions.

2. An apparatus according to claim 1, wherein said table defining means comprises means for indicating, as an item of the conclusion information, an address of a document incorporating another intelligent information retrieval program generated based on another table comprising data indicating a question, answer alternatives for the question, and conclusion information for the answer alternatives of the question.

3. An apparatus according to claim 1, wherein the document is a hypertext document.

4. An apparatus according to claim 1, wherein said retrieval program generating means comprises means for generating the program in accordance with a predetermined script language.

5. An apparatus according to claim 1, wherein said retrieval program generating means comprises means for generating the program as software parts executable by a predetermined interpreter.

6. An intelligent retrieval system for retrieving intelligent information on an interactive basis, said system comprising:

a document storage storing a document incorporating an intelligent information retrieval program the program comprising instructions for presenting questions to a user of the document, receiving answers input by the document user as responses to the questions on an interactive basis, and displaying conclusions in response to the answers; and a structured document browser for executing the intelligent information retrieval program responsive to a request from a user to use the document, whereby the user can browse the document.

7. An intelligent information retrieval system according to claim 6, wherein said structured document browser comprises a World Wide Web browser.

8. A method for generating a program for providing an intelligent information retrieval function, comprising the steps of:

defining a table comprising data indicating questions to be answered by a user, answer alternatives for the questions, and conclusion information to be correlated to the answer alternatives; and generating an intelligent information retrieval program based on the table and incorporating the program into a document, whereby the program presents the questions to a user of the document, receives answers input by the document user as responses to the questions. and displays conclusions responsive to the received answers based on knowledge established in the table, the knowledge correlating the conclusion information to the answer alternatives.

9. An apparatus for generating a program providing an intelligent information retrieval function, said apparatus comprising:

a table defining unit defining a table comprising data indicating questions to be answered by a user, answer alternatives for the questions, and conclusion information to be correlated to the answer alternatives;

a knowledge establishing unit displaying the table and establishing answer conditions in the table responsive to inputs for the answer alternatives, the answer conditions correlating the conclusion information to the answer alternatives; and a retrieval program generating unit generating an intelligent information retrieval program based on the table and incorporating the program into a document, whereby the program presents the questions to a user of the document, receives answers input by the document user as responses to the questions, and displays conclusions responsive to the received answers based on the answer conditions.

10. An information retrieval system, comprising:

a program generator to generate a structured document to be used by a user at a client terminal, the structured document including a retrieval program for presenting questions to the user, receiving answers input by the user responsive to the presented questions, and selecting conclusion information based on the received answers; and a server to deliver the structured document to the client terminal, to receive the selected conclusion information from the client terminal, and to deliver to the client terminal further information retrieved from a database based on the selected conclusion information.

11. An apparatus for generating a structured document for intelligent information retrieval, said apparatus comprising:

a code generator to generate an information retrieval program based on conclusion-determining information including questions to be presented to a user, answer alternatives selectable by the user responsive to the questions, and conclusion information corresponding to each answer alternative; and means for incorporating the information retrieval program into a structured document to be used by the user at a user terminal, use of the structured document invoking the information retrieval program to present one or more of the questions to user, receive an answer from the user responsive to each of the one or more questions, and select conclusion information based on each received answer.

12. An apparatus according to claim 11, wherein said code generator includes means to incorporate into the information retrieval program a procedure for requesting document information from a server in communication with the user terminal when the selected conclusion information includes an address for the document information.

13. An apparatus according to claim 11, wherein said code generator includes means to incorporate into the information retrieval program a procedure for presenting a further one or more questions to the user when the selected conclusion information indicates further conclusion-determining information including the further one or more questions, further answer alternatives for the further one or more questions, and further conclusion information corresponding to each of the further answer alternatives.

* * * * *